United States Patent
Burns et al.

[11] Patent Number: 5,824,768
[45] Date of Patent: Oct. 20, 1998

[54] POLYMERIC DYES FOR OPTICAL RECORDING LAYERS AND ELEMENTS

[75] Inventors: Elizabeth Gertrude Burns; Csaba Andras Kovacs, both of Rochester; Ramanuj Goswami, Webster; Derek D. Chapman, Rochester, all of N.Y.

[73] Assignee: Eastman Kodak Company, Rochester, N.Y.

[21] Appl. No.: 909,497

[22] Filed: Aug. 12, 1997

Related U.S. Application Data

[62] Division of Ser. No. 618,489, Mar. 19, 1996.

[51] Int. Cl.$^6$ .................................................... C08G 73/00
[52] U.S. Cl. ................... 528/422; 528/425; 430/270.14; 430/945; 428/64.8
[58] Field of Search .................................. 528/422, 425; 43/270.14, 945; 428/64.8

[56] References Cited

U.S. PATENT DOCUMENTS

| | | | |
|---|---|---|---|
| 4,501,876 | 2/1985 | Zahr | 528/232 |
| 4,619,990 | 10/1986 | Elmasry | 534/573 |
| 4,666,819 | 5/1987 | Elmasry | 430/270 |
| 4,680,375 | 7/1987 | Elmasry | 528/253 |
| 4,737,444 | 4/1988 | Satoh et al. | 430/272 |
| 4,739,029 | 4/1988 | Elmasry . | |
| 4,857,427 | 8/1989 | Itoh et al. | 430/19 |
| 4,861,697 | 8/1989 | Hulme-Lowe et al. | 430/270 |
| 4,948,715 | 8/1990 | Hulme-Lowe et al. | 430/495 |
| 5,093,492 | 3/1992 | Acker et al. | 544/123 |
| 5,645,910 | 7/1997 | Burns et al. | 428/64.1 |

FOREIGN PATENT DOCUMENTS

| | | | |
|---|---|---|---|
| 3341787 | 6/1988 | Germany | G11B 7/24 |
| 3-207691 | 10/1991 | Japan | B41M 5/26 |
| 5-125061 | 5/1993 | Japan | C07D 249/14 |
| 94/12352 | 6/1994 | WIPO | G03C 7/02 |

*Primary Examiner*—Duc Truong
*Attorney, Agent, or Firm*—John R. Everett

[57] ABSTRACT

There is disclosed a recordable optical element that includes a polymeric dye. The element has a transparent substrate and on the surface of the substrate, a polymeric dye containing recording layer and a light reflective layer. The improvement is that polymeric dyes are used in the element, which improve the recording layer's cohesion and the adhesion to the substrate and the reflective layer.

36 Claims, No Drawings

POLYMERIC DYES FOR OPTICAL RECORDING LAYERS AND ELEMENTS

This is a Divisional of application Ser. No. 08/618,489, filed 19 Mar. 1996, now abandoned.

FIELD OF THE INVENTION

The present invention relates polymers and to their use in optical recording layers and elements.

BACKGROUND OF THE INVENTION

There are many different types of optical recording elements known. In most of these elements, the mode of operation requires that the unrecorded recording layer have a high absorption at the wave length of the recording laser, to maximize the energy absorbed, and the resulting marks from the write process have high reflectivity. This is achieved by having a reflective layer in back of the dye layer and ablating or fading the dye in the process of recording making highly reflective marks.

A current popular form of an optical element is the compact disc or CD. On these discs the digital information is stored in the form of low reflectivity marks, at the read wavelength, on an otherwise highly reflective background. This is the exact opposite of the above described optical recording elements. In this format, the optical information is most often in the form of read only memory or ROM. Optical information is not recorded in real time but rather is produced by press molding. In a typical process, the optical recording substrate is first press molded with a master containing the digital information to be reproduced. The thus formed information is then overcoated with a reflective layer and then with an optional protective layer. In those areas having the written marks, the reflectivity is lower than in those areas not having the written marks.

It is desirable to produce optical recording elements which, when recorded in real time, produces a record that mimics the conventional CD on read out. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording element. Images can then be played back on a CD type player into a conventional television. Since a CD has a capacity for a number of digitized images that is greater than the typical roll of consumer film, it is anticipated that the user will want to add images in multiple sessions to a CD. Thus the need for recordable, CD compatible optical recording elements.

One method for forming a recordable element that mimics conventional mold pressed CD elements is to provide a heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Elements of this type are described in U.S. Pat. No. 4,940,618, European Patent Application 0,353,393 and Canadian Patent Application 2,005,520.

Commercially useful materials for elements have stringent requirements. One of these requirements is layer integrity. Since the Photo CD is a consumer product, it must be capable of withstanding extreme environments. Between the time the original images are recorded on the Photo CD and the time subsequent images are added, the CD might be handled quite extensively. The recording layer must have sufficient cohesive strength within the layer and sufficient adhesive strength between the adjacent layers to retain its integrity through the handling process. In general, all monomeric dyes have very limited cohesive and/or adhesive strengths toward the adjacent layers, especially toward the reflective layer.

In the U.S. and the European applications mentioned above, the preferred dyes for the recording layer are indodicarbocyanine dyes. Layers made from this type of dye have less than the desired integrity. The dye layer can be separated from the reflective gold layer with very little force. Thus, there is a continuing need for optical recording layers that have the necessary optical characteristics so that they are CD compatible and yet have good adhesive and cohesive characteristics It is to the solution to this problem that the present invention is directed.

SUMMARY OF THE INVENTION

The present invention provides a polymer (a) having, from 775 nm to 790 nm, a real refractive index (N) of >1.8 and an imaginary index (k) of 0.005 to 0.3; and (b) comprises from 75 to 100 mole percent repeating units according to Formula I:

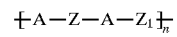   I wherein

A represents a divalent radical selected from urethane, carbonate, urea, ester and amide;

Z represents $C_2$–$C_{18}$-alkylene; $C_3$–$C_8$-cycloalkylene; $C_1$–$C_4$ alkylene bonded to $C_3$–$C_8$ cycloalkylene bonded to $C_1$–$C_4$ alkylene; $C_1$–$C_4$ alkylenearylene bonded to $C_1$–$C_4$ alkylene; $C_2$–$C_4$ alkoxy bonded to $C_2$–$C_4$ alkylene; arylene bonded to $C_1$–$C_4$ alkylene bonded to arylene; and $C_3$–$C_8$ cycloalkylene bonded to $C_1$–$C_4$-alkylene bonded to $C_3$–$C_8$ cycloalkylene;

$Z_1$ represents a divalent dye radical selected from cyanines, formazans, metallized formazans, azos, metallized azos, metallized azo ethers, phthalocyanines, metallized phthalocyanines; and squariliums; and n represents the number of repeat units needed to build a polymer chain of a size that corresponds to a polystyrene chain of weight average molecular weight ($M_w$) of 5,000 to 1,000,000.

The polymeric dyes comprise a polymeric backbone having 3 or more of the repeating units containing the light absorbing divalent dye radicals. In contrast monomeric refers to a single dye with one or more chromophores in the dye moiety, but not or a part of a polymeric backbone.

The present invention also provides an optical recordable element, particularly recordable optical elements, having a transparent substrate bearing a recording layer containing a polymeric dye of the invention and a light reflecting layer.

The very stringent requirements of the reflectivity and the contrast needed for the writable CD media make it quite unobvious that the polymeric dyes would be functional in such a system. The macromolecular structures of the polymeric dyes are usually so different than their monomeric analogs as far as the mobility, the inherent free volume, the solubility in coating solvents, and the associated reduction of the active chromophore by about 30% due to the connecting linking groups—that it is totally unobvious that corresponding polymeric material have any apriori chance of being successful in the application. Especially the observed improvements in the package integrity or product durability, when polymeric dyes are used instead of the monomeric counterparts, are quite unobvious.

DETAILS OF THE INVENTION

Weight average molecular weights of the polymers of the invention are determined by size exclusion chromatography (SEC) in 20/80 dichloroacetic acid/dichloromethane (DCAA/DCM) containing 0.01M tetrabutylammonium acetate using three 10 μm PLgel mixed-bed columns. The column set was calibrated with narrow-molecular-weight distribution polystyrene standards between 500 (log M=2.70) and 2,750,000 (log M=6.44) daltons. Results are plotted as polystyrene-equivalent molecular weights and weight average ($M_w$), weight are calculated from each plot.

The useful molecular weight range of the polymeric dyes is from 5,000 to 1,000,000. Below the lower end of this range the oligomers are expected to have monomeric characteristics. Above the higher end of this range, it is predicted that the viscosity of the polymers will be too high to give acceptable coatings.

The polymers of the invention also include copolymers in which divalent dye radicals and/or the connecting units are outside the definition of Structure I. Such copolymers comprise 0 to 25 mole percent of these divalent dye radicals. The polymer may also be a copolymer containing repeating units according to the invention and up to 25 mole percent repeating units that do not include any dye radicals.

Repeating units other than the dye radicals may be prepared from 1,2-ethanediol, 1,3-propanediol, 1,2-propanediol, 3-methoxy-1,2-propanediol, 3-(dimethylamino)-1,2-propanediol,2,2-dimethyl-1,3-propanediol, butanediol, pentanediol, hexanediol, heptanediol, octanediol, 1,3-cyclohexanediol, 1,4-cyclohexanediol, 1,4-cyclooctanediol, 1,5-decalindiol, di(ethyleneglycol), tri(ethyleneglycol),hexa(ethyleneglycol), di(propyleneglycol), tri(propyleneglycol), 1,2-ethanediamine, 1,3-ethanediamine, 1,2-ethanediamine, butanediamine, pentanediamine, hexanediamine, heptanediamine, octanediamine, 1,3-cyclohexanediamine, 1,4-hexanediamine, 1,3-phenylenediamine, 1,4-phenylenediamine, 4,5,10-trioxa-1,13-tridecanediamine and piperazine.

Polymeric Dyes

In general the polymers are prepared by converting the relevant dye compounds into diols or diamines monomers. The monomers are then converted into polymers using well known polymerization procedures. Refractive indices, N and k, were measured using a variable angle spectroscopic ellipsometer manufactured by J. A. Woollam Company. The polymeric dyes, having the desired N and k values, mentioned above, are selected as useful in the present invention.

A. Polymers comprising divalent cyanine dye radicals

Useful polymers within the scope of Formula I wherein $Z_1$ is a divalent cyanine dye radical can be derived from the cyanine dyes of Formula II:

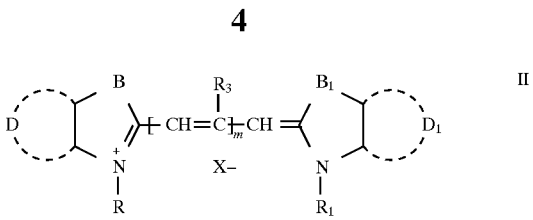

wherein

D and $D_1$ represent sufficient atoms to form a fused substituted or unsubstituted aromatic ring such as phenyl, naphthyl; or heterocyclic ring such as pyridyl;

B and $B_1$ represent

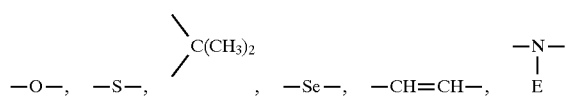

in which E represents an substituted or unsubstituted $C_1$ to $C_{10}$ alkyl and an aromatic ring such as phenyl and naphthyl; or B may combine with D, or $B_1$ may combine with $D_1$, to form fused aromatic rings;

R and $R_1$ represent, $C_1$ to $C_{10}$ alkyl and $C_7$ to $C_{20}$ arylalkyl such as benzyl and phenethyl;

$R_3$ represents hydrogen, $C_1$ to $C_{10}$ alkyl, $C_7$ to $C_{20}$ arylalkyl such as benzyl and phenethyl; and halogen such chlorine and bromine;

X represents a anionic counter ion selected from

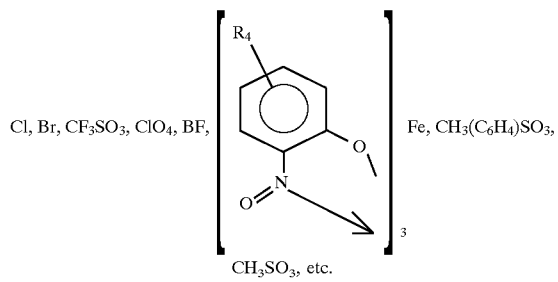

$R_4$ represents hydrogen, $C_1$ to $C_{10}$ alkyl, $C_1$ to $C_{10}$ alkoxy, and halogen such as chlorine, bromine and fluorine; $R_4$ may also represent the atoms necessary to form a fused aromatic ring; and m represents an integer from 1 to 2.

Useful polymers within the scope of Formula I wherein $Z_1$ is a divalent cyanine dye radical are represented by Formula III:

Representative polymers having Formula II cyanine dye radicals are presented in Formula III:

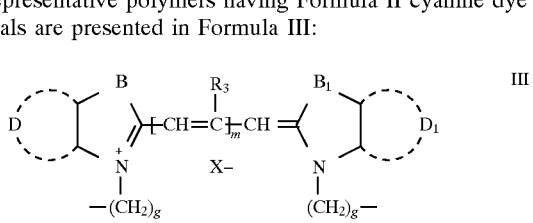

g represents an integer from 2 to 10;

m represents an integer from 1 to 2; and n corresponds to $M_w$ of 5,000 to 100,000.

Polymers having Formula III dye radicals are presented in Formula IV:

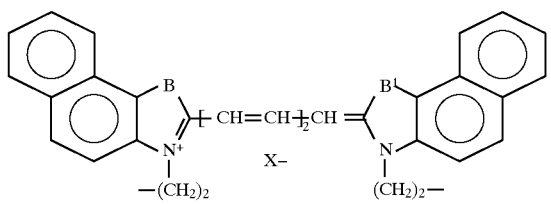

Synthesis of a Cyanine Monomer

The following preparation provides a representative method of making polymers having cyanine dye radicals according to Formula II, III and IV. In general, cyanine diols or cyanine diamines are prepared. Polymers are then prepared from the diols or diamines according to well known polymerization procedures.

The cyanine diol prepared as follows is used in making a number of the polymers in Table 1, infra.

The compounds 2,3,3-trimethyl-(3H)-benz[e]indole (200 g, 1.26 moles) and 2-bromoethanol (500 g, 4 moles) were heated, with stirring, to 100° C. for 24 hrs. The reaction mixture was cooled to 50° C. and poured into 2 L stirring isopropanol. Crystals began to appear after thirty minutes; the mixture was allowed to stir overnight. The crystalline solid was filtered and dried yielding 97.8 g of the desired product (confirmed by $^1$H NMR).

The quaternary salt described above (50 g) was dissolved in 2 L pyridine and the solution brought to reflux. Trimethoxypropene was added from an addition funnel in a steady stream. The reaction mixture was allowed to reflux 15 minutes after the addition, then cooled to room temperature and poured into 16 L stirring ethyl acetate. After stirring for an hour the slurry was left to settle overnight then filtered, washed with 1 L ethyl acetate and dried in a vacuum oven overnight yielding 41 g crude product. The crude product was combined with 1 L 3/1 isopropanol and water and refluxed for thirty minutes then cooled to room temperature. Water (1 L) was added to precipitate the product which was collected by filtration and dried in a vacuum oven overnight yielding 20.5 g green solid, estimated 99% pure by HPLC.

The bromide salt described above (2.3 g) was slurried in 50 mL methanol and brought to reflux. Trifluoromethanesulfonic acid (3 mL) was added dropwise to the refluxing slurry. The heat was removed as soon as addition was complete and the mixture was allowed to cool to room temperature. Water (100 mL) was added to the room temperature mixture, and the mixture was filtered to collect the desired salt. The filtrate was washed with water and dried in a vacuum oven overnight.

Polymer H-1 of Table 1 was prepared from the above prepared dye-diol. Two grams of the dye-diol were dissolved in 8 mL anhydrous dimethyl acetamide, to which was added 0.46 mL hexamethylene diisocyanate and 20 μl dibutyltindilaurate. This was sealed and stirred 24–48 hrs at 60° C., then precipitated into water, collected and dried.

Table 1 presents polymers containing cyanine dye radicals. The polymers were prepared using variations of the procedure for preparing polymer H-1.

TABLE 1

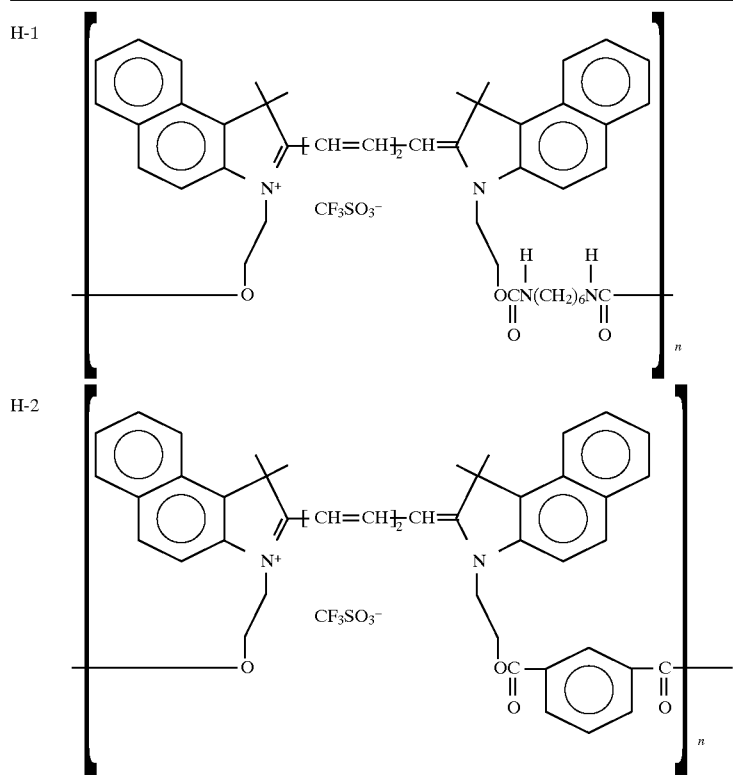

TABLE 1-continued
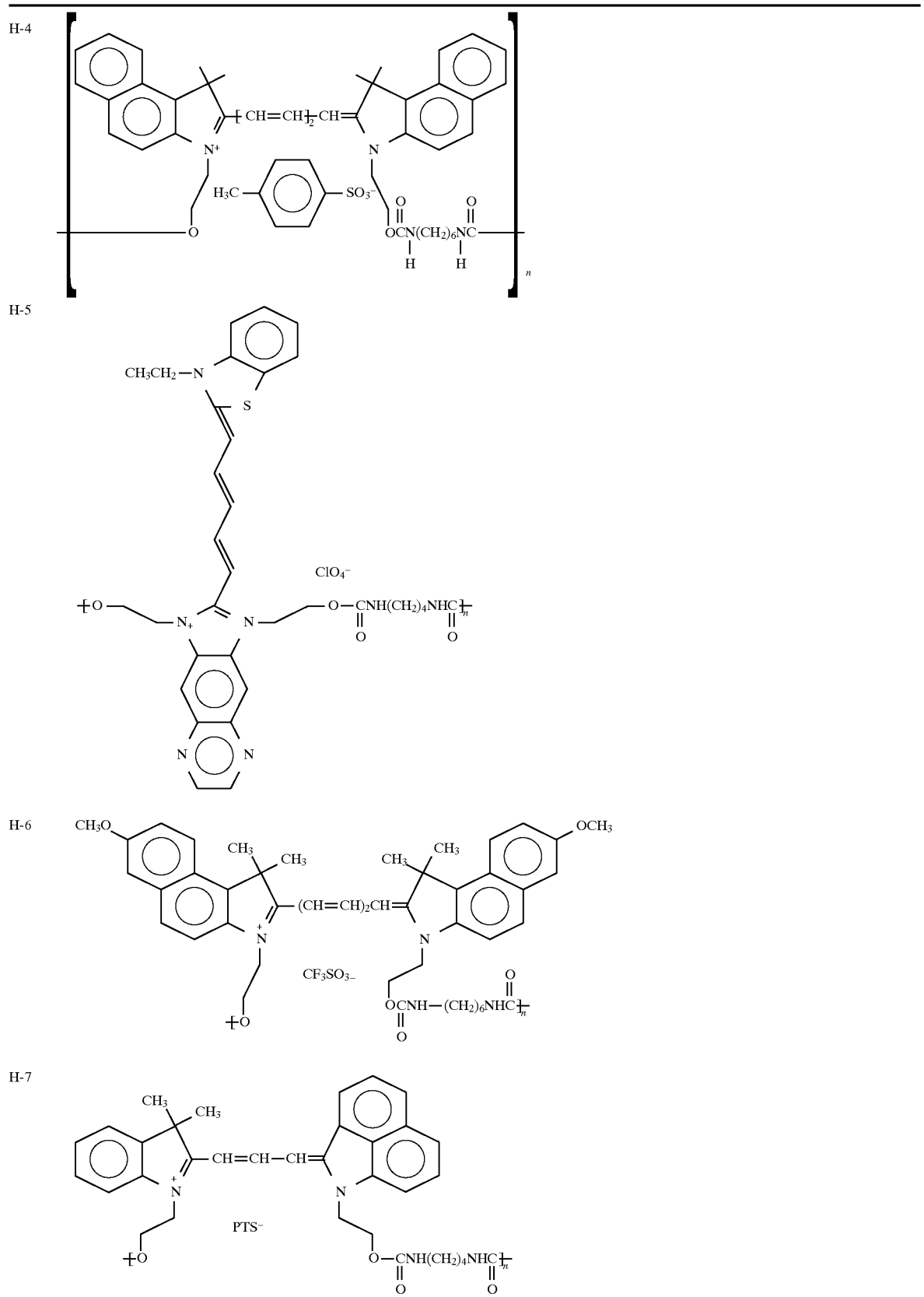

TABLE 1-continued
H-8
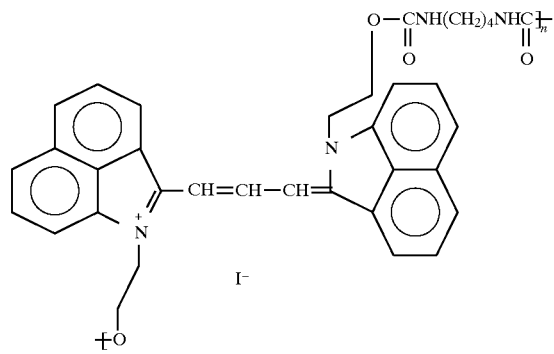
H-9
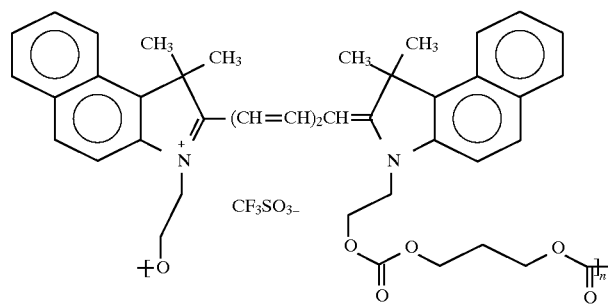
H-10
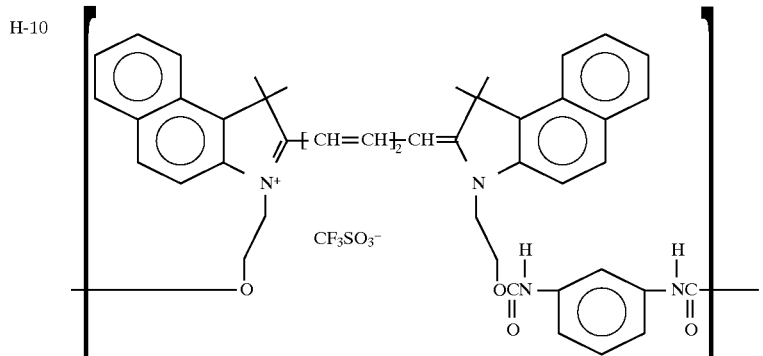
H-11
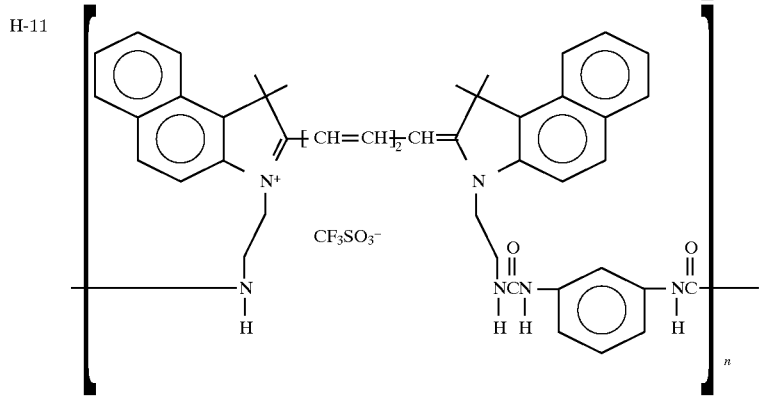

TABLE 1-continued
H-12
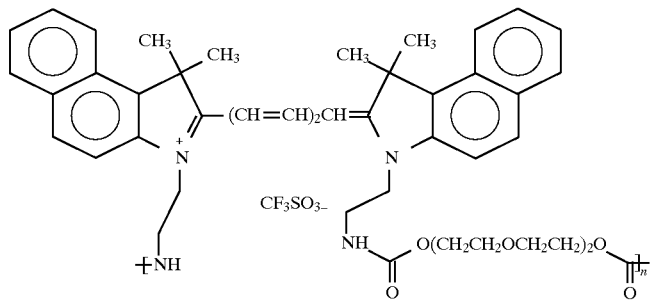
H-13
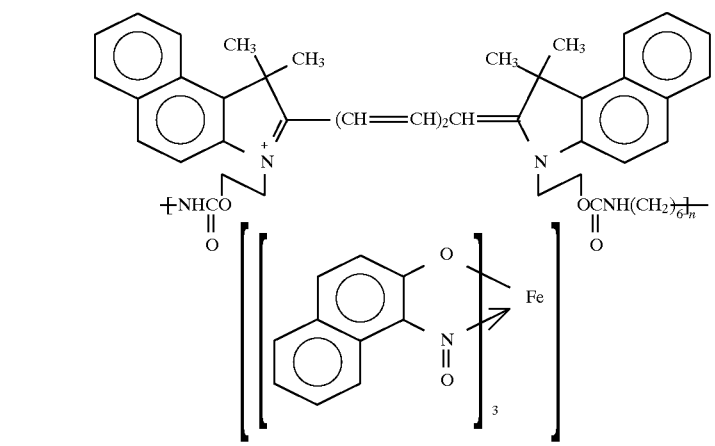
H-14
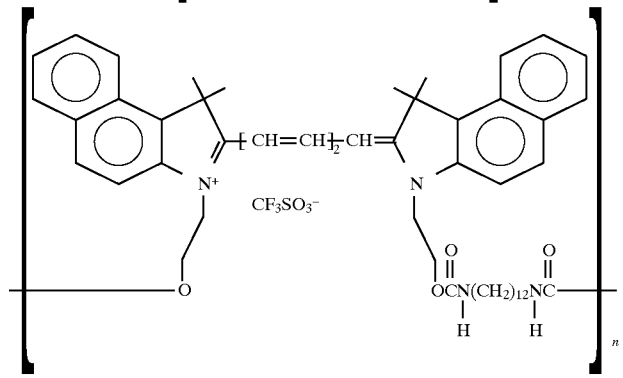
H-15
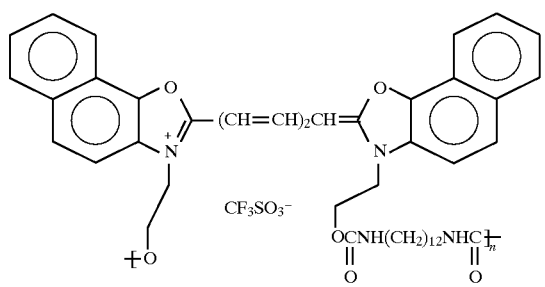

TABLE 1-continued
H-16
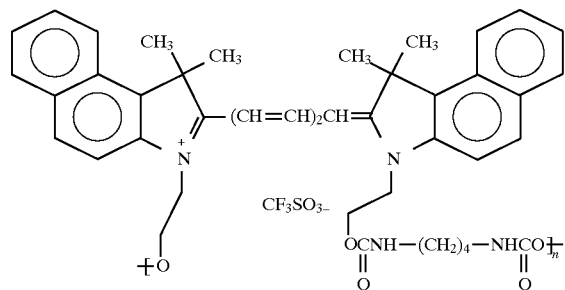
H-17
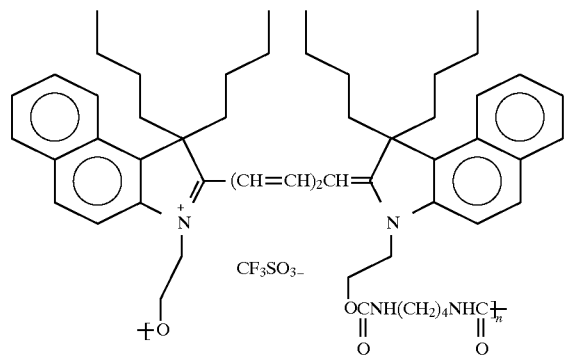
H-18
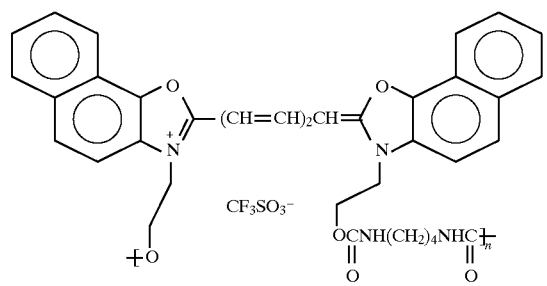
H-19
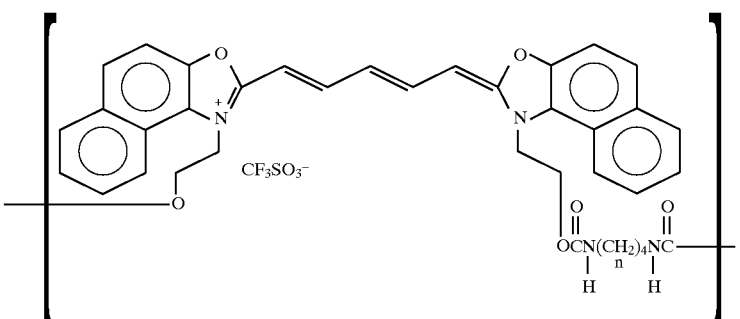
H-20
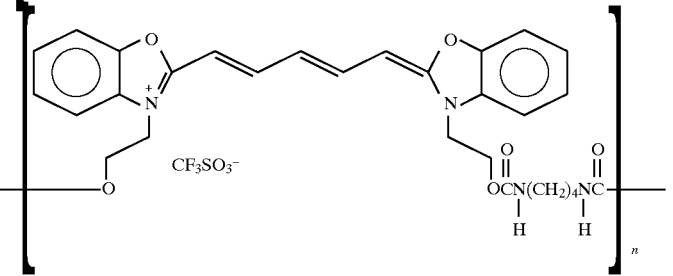

TABLE 1-continued
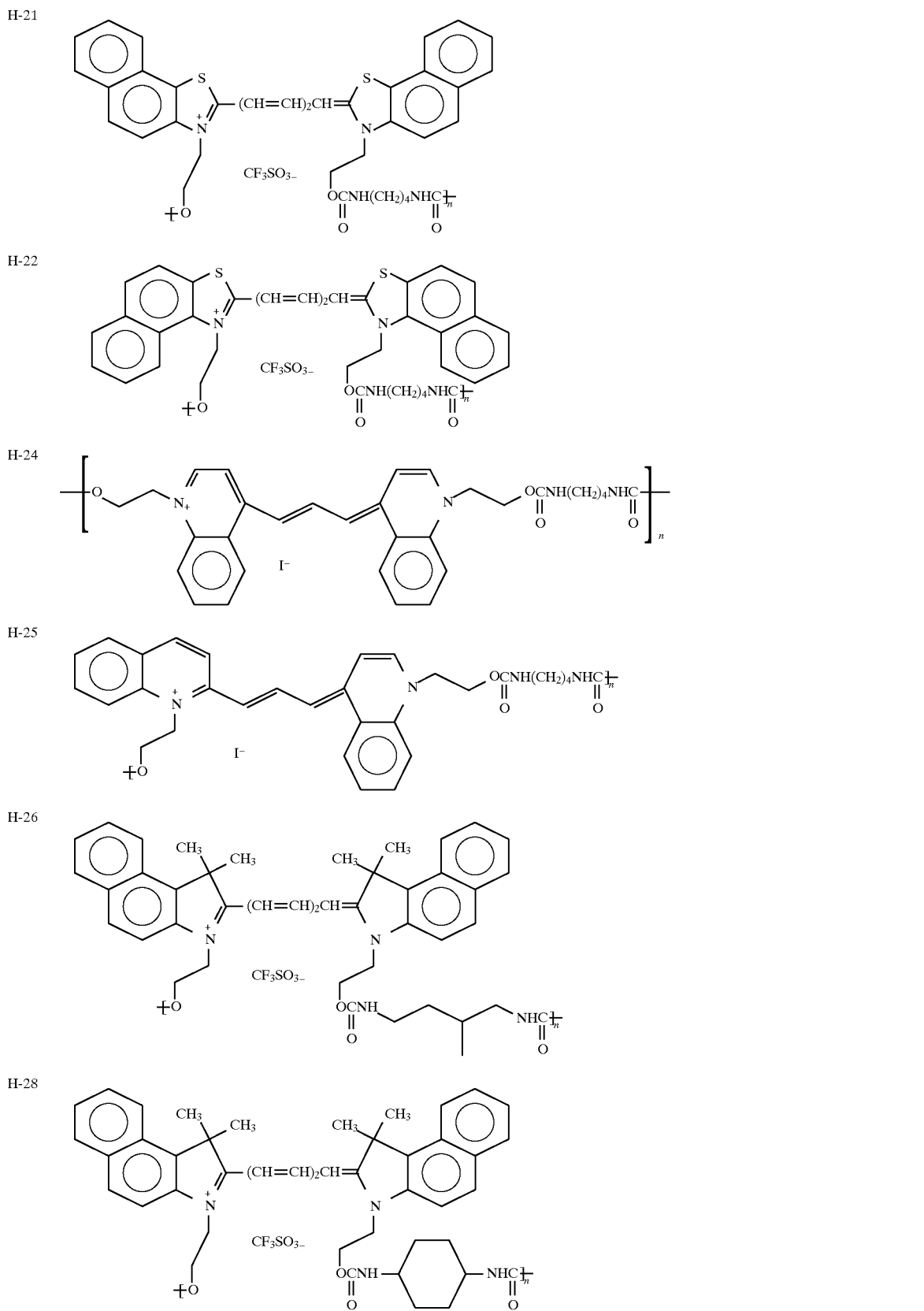

TABLE 1-continued
H-29
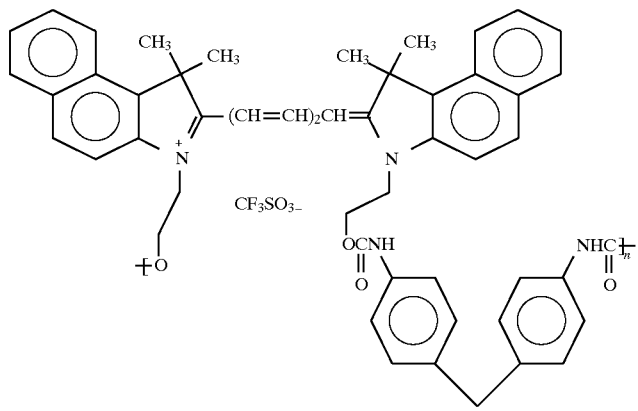
H-30
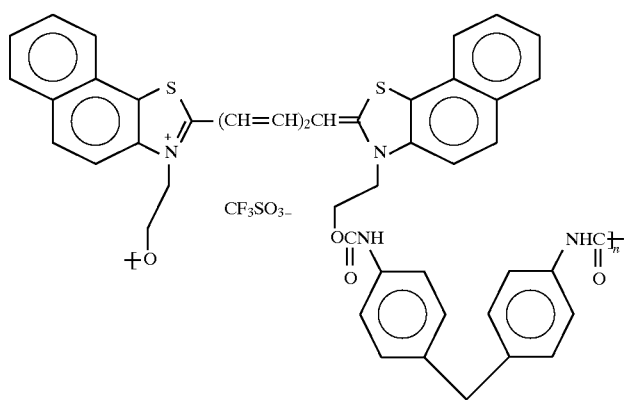
H-31
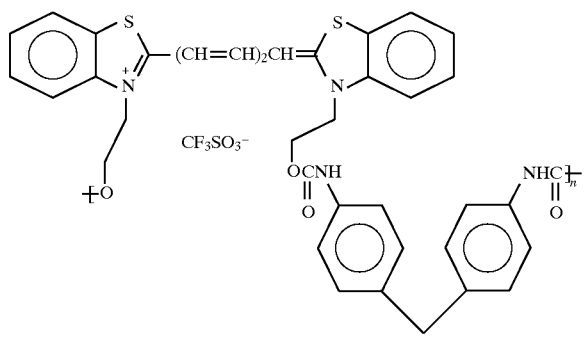
H-32
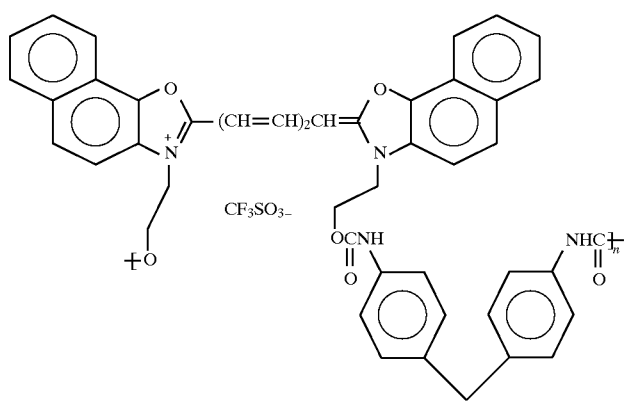

TABLE 1-continued
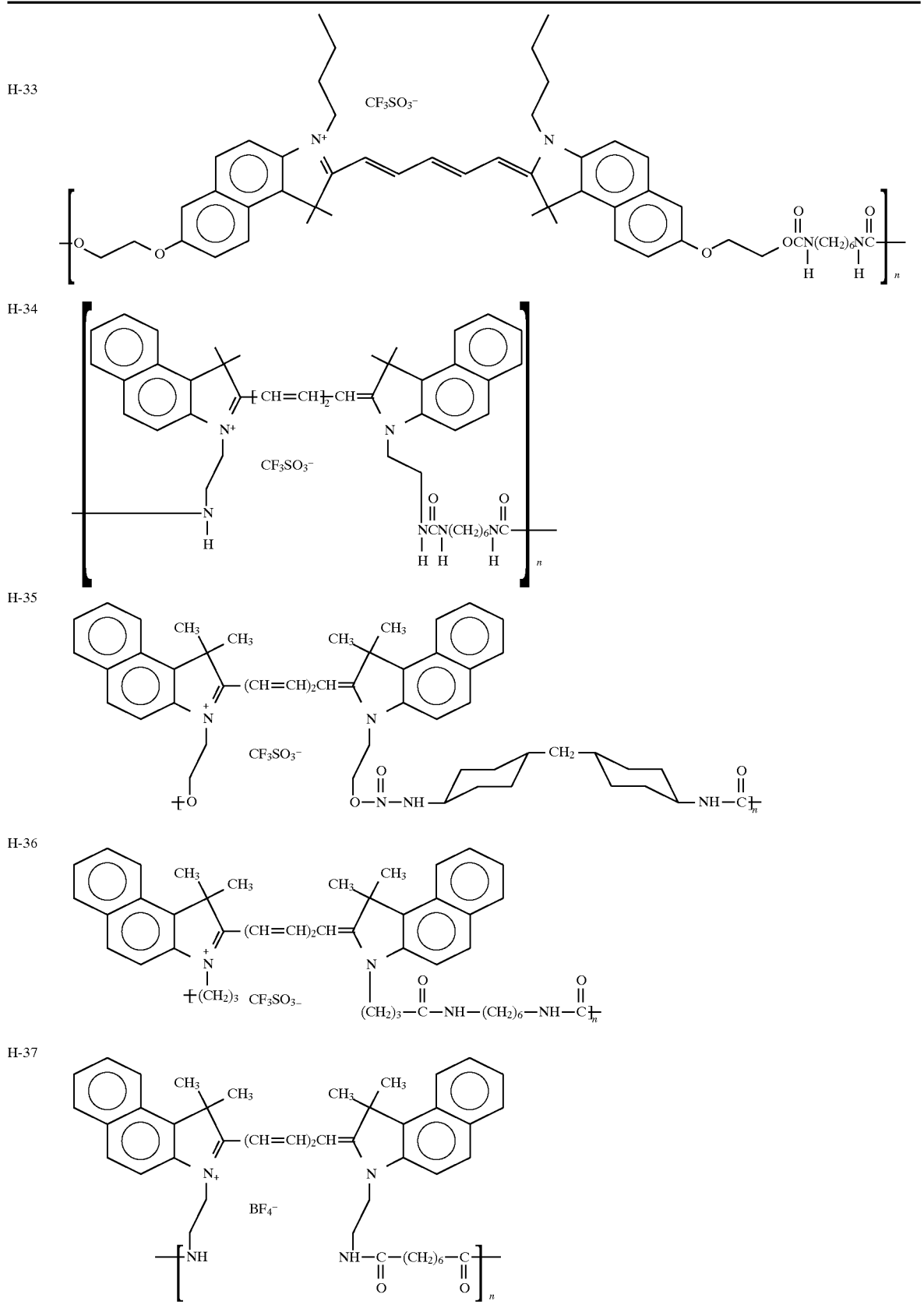

TABLE 1-continued
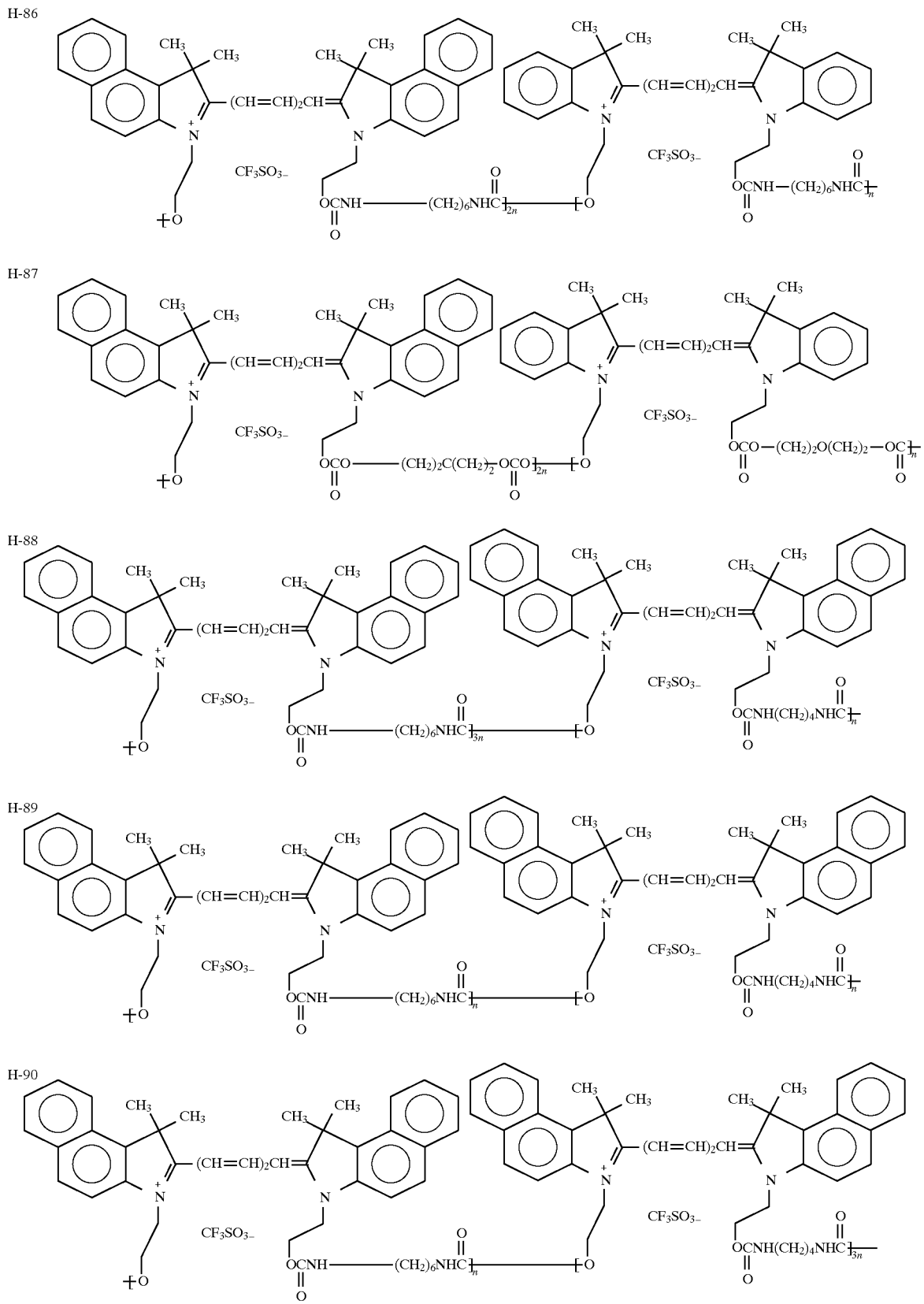

TABLE 1-continued
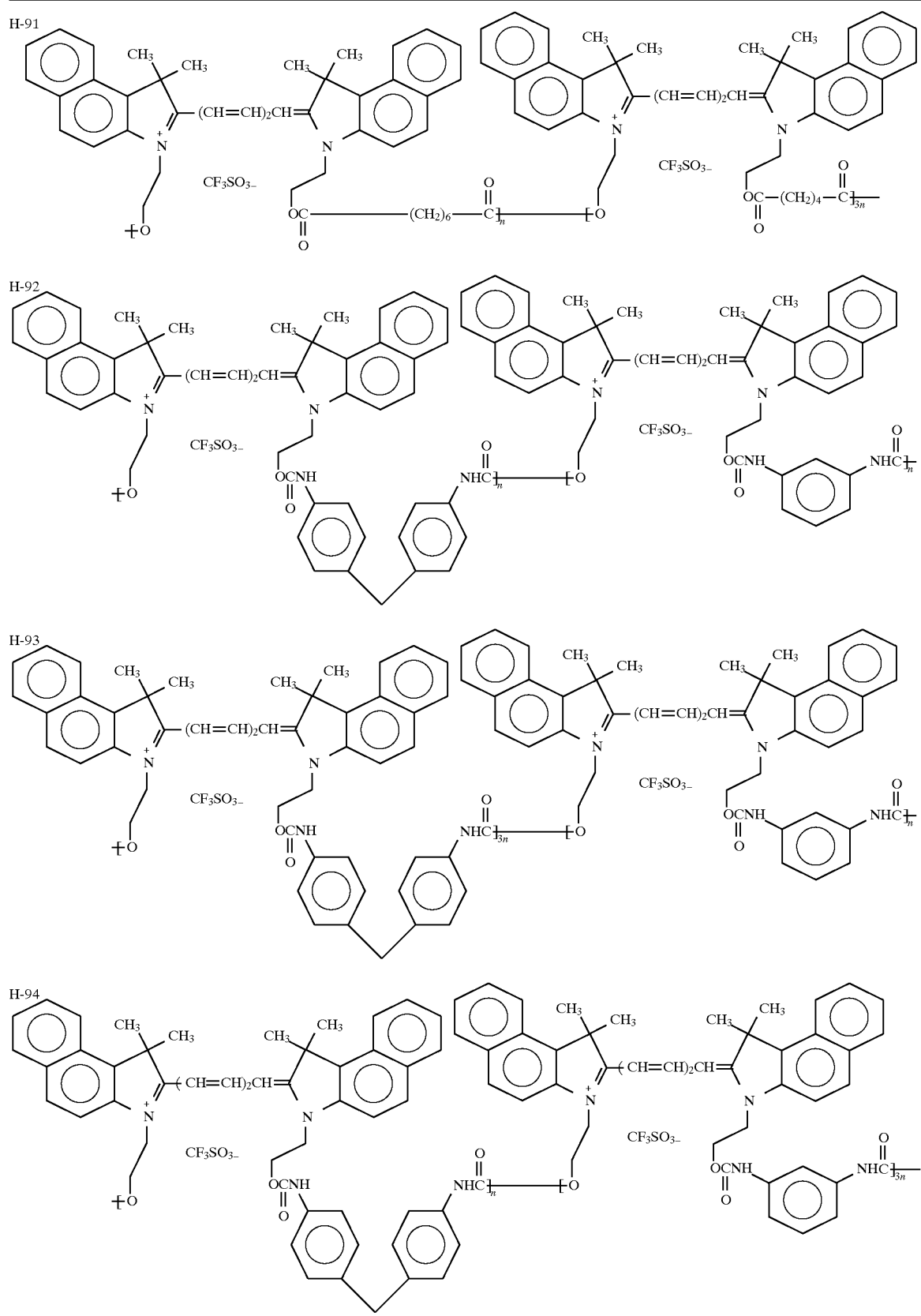

TABLE 1-continued
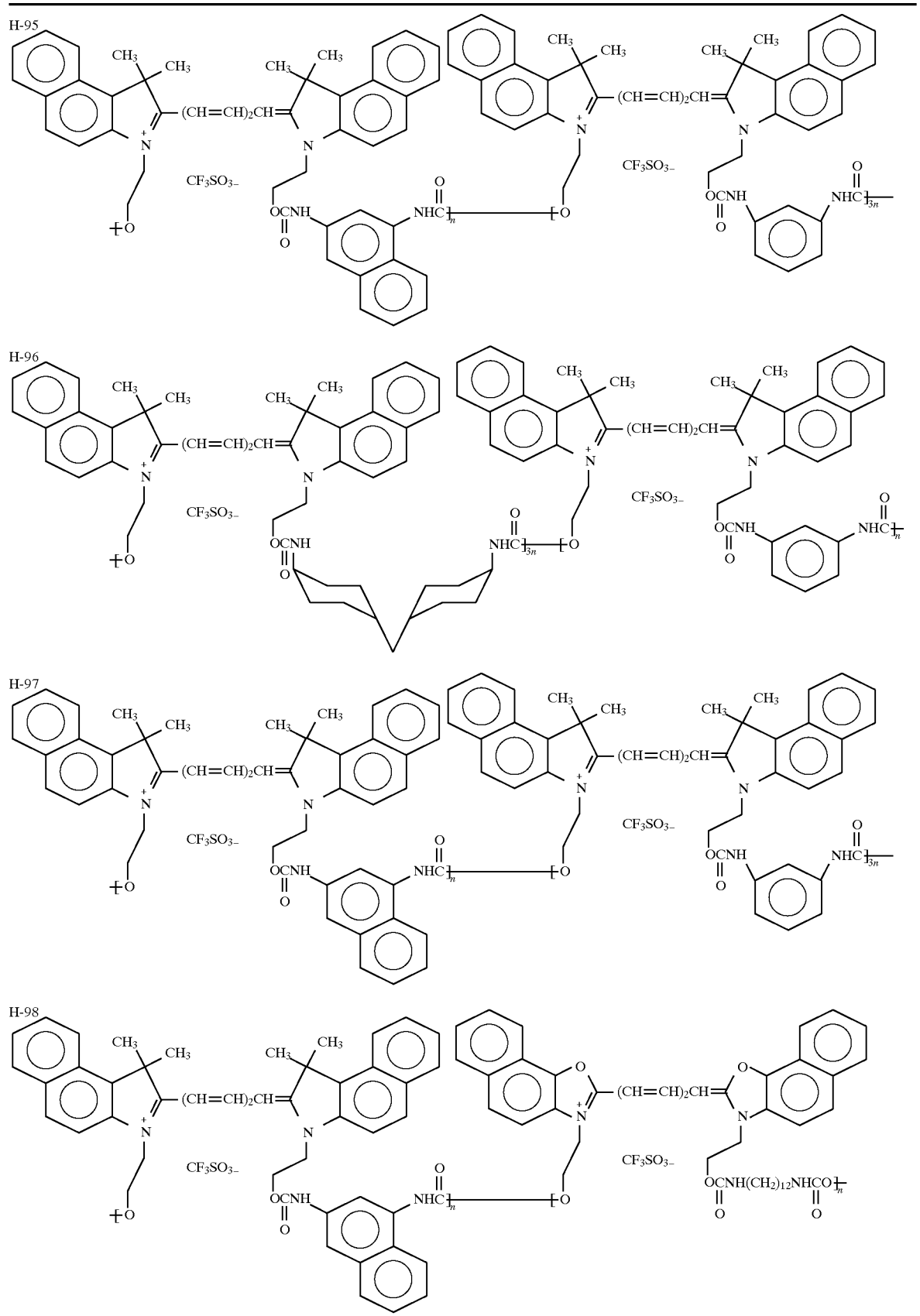

TABLE 1-continued
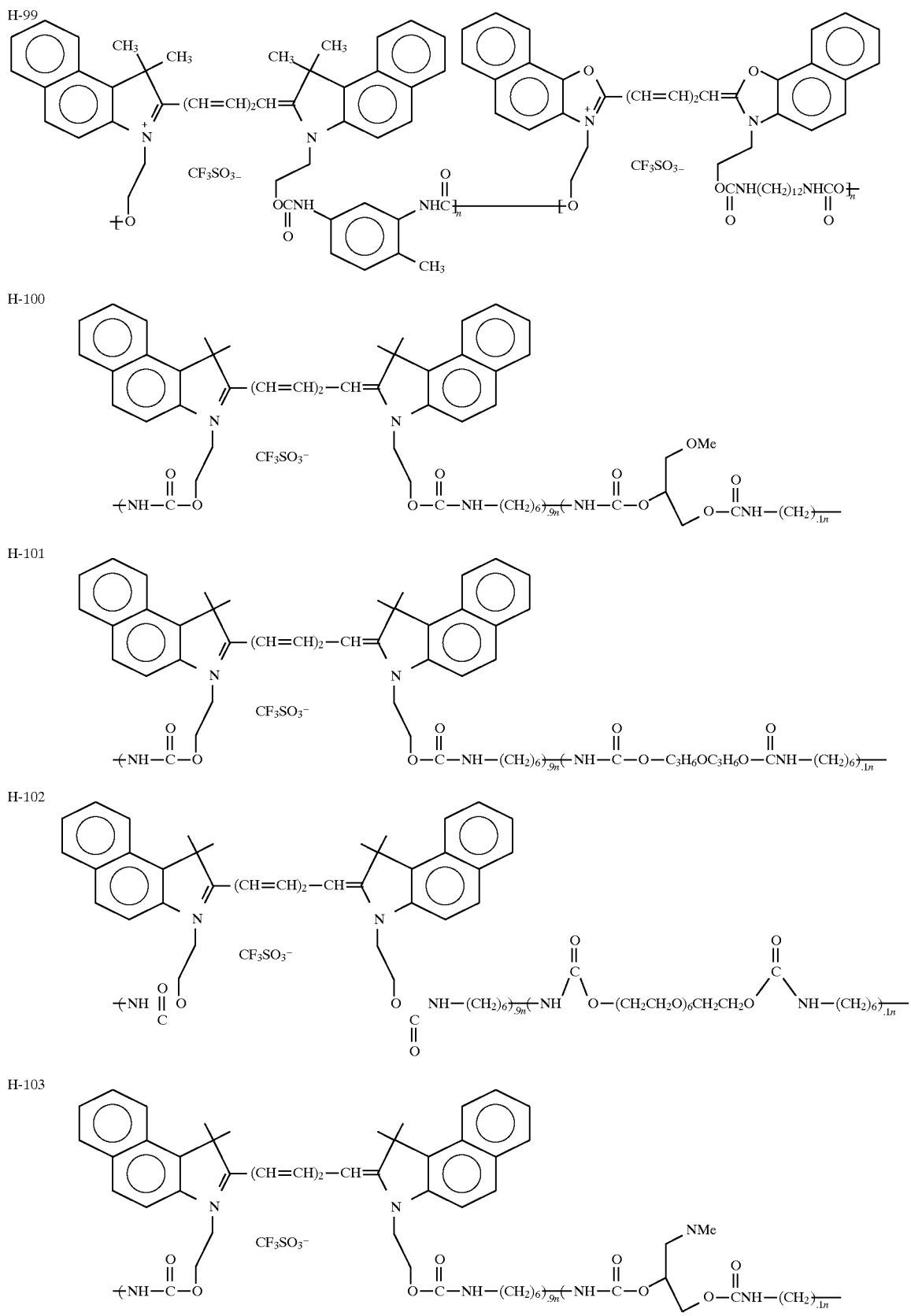

TABLE 1-continued
H-110
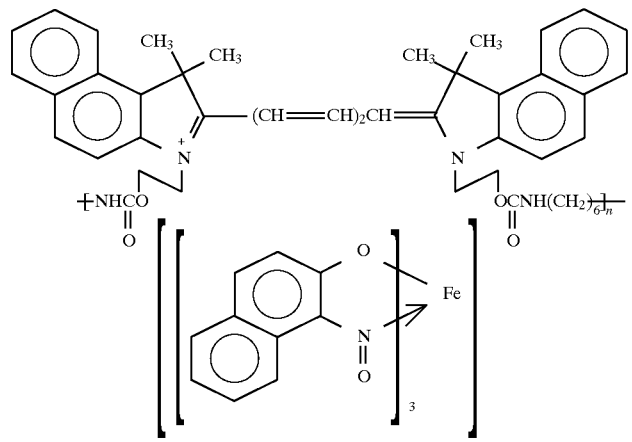
H-111
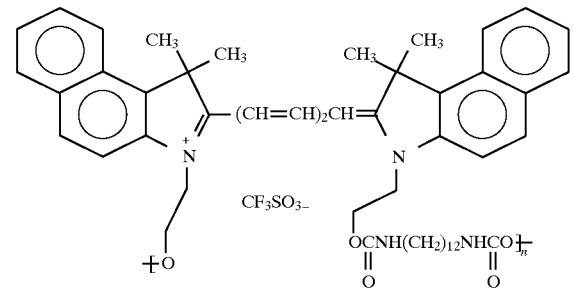
H-121
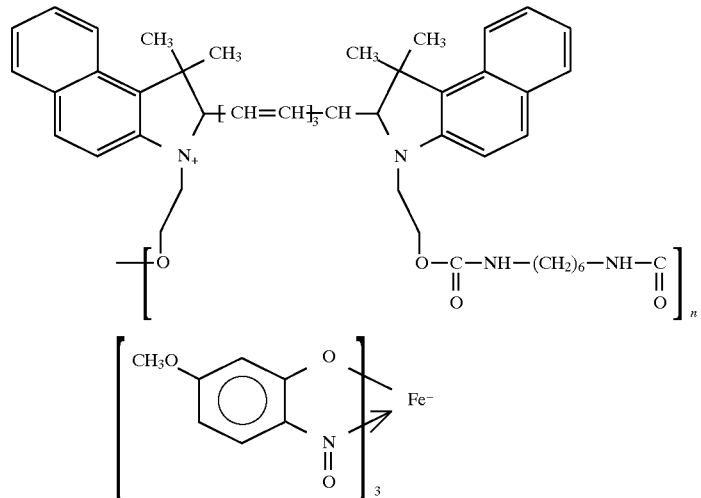
B. Polymers Comprising Divalent Metallized Formazan Dye Radicals
Useful polymers within the scope of Formula I wherein $Z_1$ is a metallized formazan dye radical can be derived from the metallized formazan dyes of Formula V:

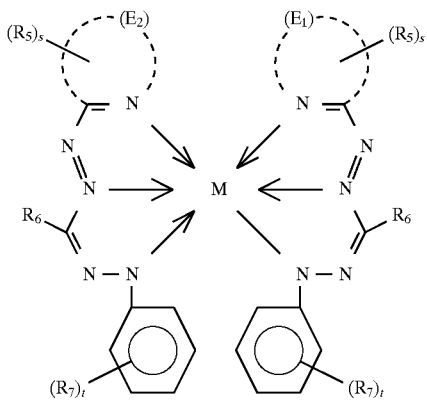

wherein
- $E_1$ and $E_2$ represent the atoms necessary to complete a 5- or 6-membered heterocyclic ring such as pyridine and thiazole which may bear fused aromatic rings such as phenyl or heteroaromatic rings such as pyridine, and pyrazine;
- $R_5$ represents hydrogen, $C_1$–$C_{20}$ alkyl, $C_6$–$C_{10}$ aryl, $C_7$–$C_{30}$ aralkyl, heteroaryl such as pyridyl, $C_2$–$C_{20}$ alkenyl; alkoxy, $C_1$–$C_{10}$ alkoxycarbonyl, $C_6$–$C_{10}$ aryloxy, $C_6$–$C_{10}$ aryloxycarbonyl, carbamyl, sulfamoyl, $C_1$–$C_{10}$ acylamino, sulfonylamino, halogen, ureido, hydroxy, carbamoyloxy, $C_1$–$C_{10}$ alkoxycarbonylamino, nitro, cyano, thiocyano, and carboxy;
- $R_6$ represents $C_1$–$C_{20}$ alkyl, heterocyclic such as pyridyl, an aromatic ring such as phenyl, $C_1$–$C_{10}$ alkoxyphenyl, $C_1$–$C_{10}$ alkylphenyl, and $C_1$–$C_{10}$ alkoxycarbonylphenyl;
- $R_7$ represents a substituent defined for $R_5$ above;
- M represents a complexing metal ion such as nickel, palladium, and zinc; and
- s and t represent integers from 0 to 4.

The metallized formazan dyes of Formula V include metallized formazan dyes of Formula VI:

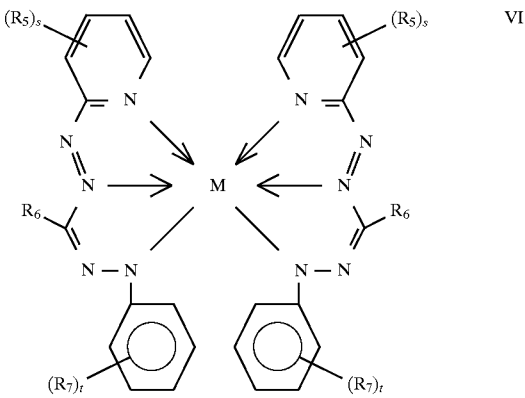

Method of Making a Metallized Formazan Diol Dye Monomer

Potassium carbonate (24.0 g, 173.9 mmol), was added to an ethanolic solution containing salicylaldehyde (19.0 g, 155.7 mmol), and allyl bromide (22.0 g, 181.8 mmol). The resulting suspension was heated to reflux overnight. The precipitated inorganic salt was filtered off. The filtrate was evaporated under reduced pressure to give the desired product, 2-allyloxy-benzaldehyde 23.0 g, yield 91%).

To a suspension containing 5-nitro-2-hydrazinopyridine (15.5 g, 100.6 mmol) in 3A alcohol (250 mL), 2-allyloxy-benzaldehyde (17.0 g, 105 mmol) was added. The resulting mixture was heated to reflux for 3 hours. The reaction mixture was cooled to room temperature. Water and ice were added to precipitate the product. The desired product was collected by filtration, and was washed with cold ethanol, and was dried. Ice and 6N hydrochloric acid were added to 4-aminophenethyl alcohol (7.5 g, 54.7 mmol). This suspension was cooled using an ice bath. To this cold suspension, a solution of $NaNO_2$ (6.3 g, 91.3 mmol) in 15 mL water was added in one portion. This resulting suspension was stirred, keeping the temperature below 5° C. until all solid dissolved (about 30 min.). Urea was added to destroy any excess nitrous acid present.

The hydrazone from the above reaction (9.0 g, 30.2 mmol) and nickel (II) acetate tetrahydrate (3.75 g, 15.1 mmol) was dissolved with sonication in 500 mL of a 1:1 mixture of methanol and N,N-dimethylformamide (DMF). The resulting solution was cooled using an ice-bath. Sodium acetate (40.0 g, 487.8 mmol) was added to this brown solution. The diazonium solution prepared above was slowly added in portions to this cold dark brown solution with vigorous stirring. Immediate cyan color was noticed. Additional amounts of DMF were added to ensure the unreacted hydrazone remained in solution; the total reaction volume was about 550 mL. The reaction mixture was allowed to come to room temperature with stirring over two hours. Glacial acetic acid (75 mL) was added to the room temperature reaction mixture, and this was allowed to stir overnight. The next morning, ice (300 g) and water (150 mL) were added to the reaction mixture, and stirring was continued until the ice melted. A precipitate formed, which was collected by filtration. The solid was extracted with dichloromethane, leaving behind insoluble inorganics. The filtrate evaporated, and the residue triturated with 3A alcohol to obtain solid material. The resulting solid was collected by filtration, washed with ethanol and water, and dried, to give 7.0 g of the desired dye.

Polymers are made from the diol using well known procedures for polymerizing diols and diamines.

Polymers having divalent metallized formazan dye radicals are presented below in Table 2.

TABLE 2
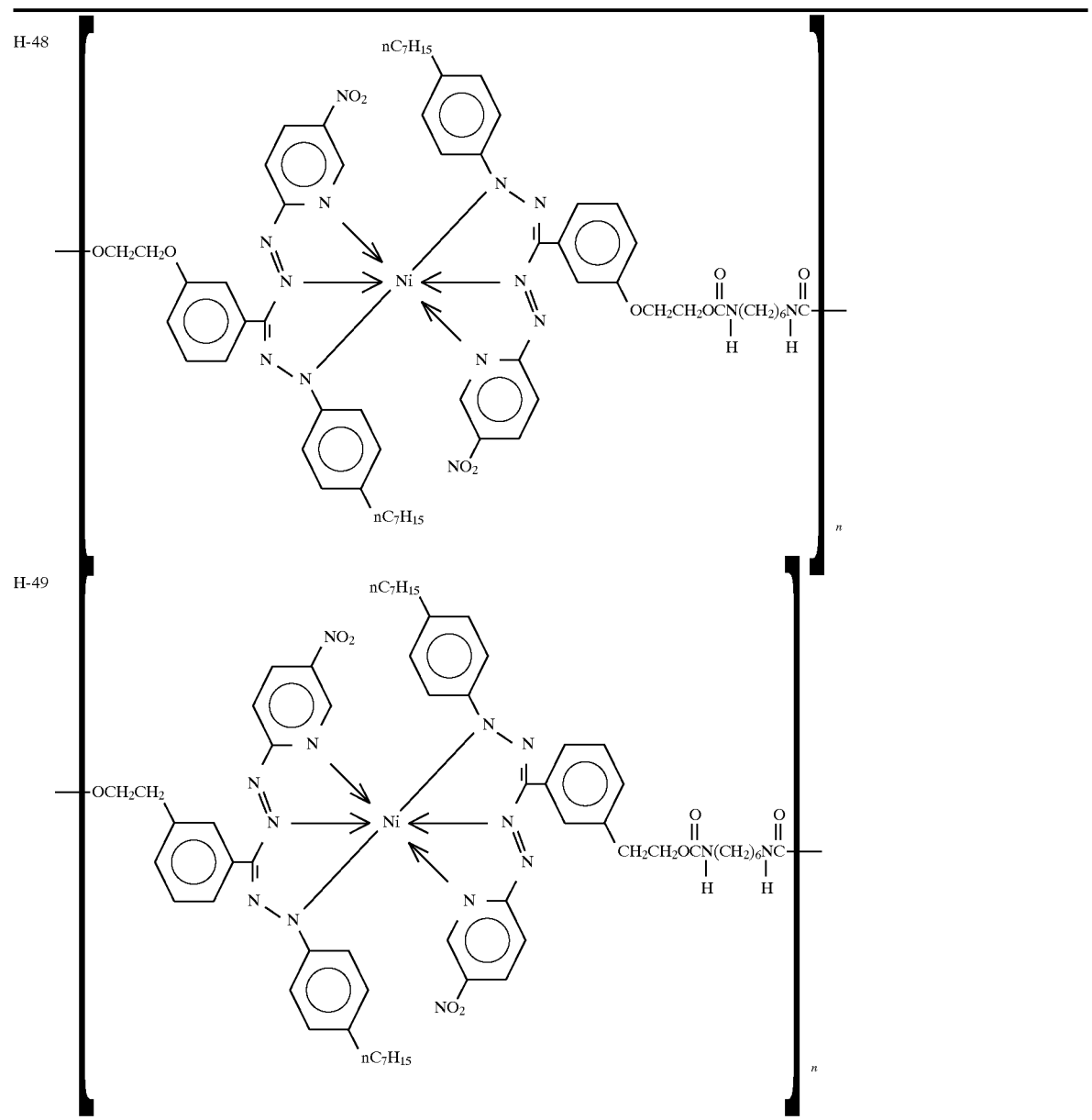

TABLE 2-continued
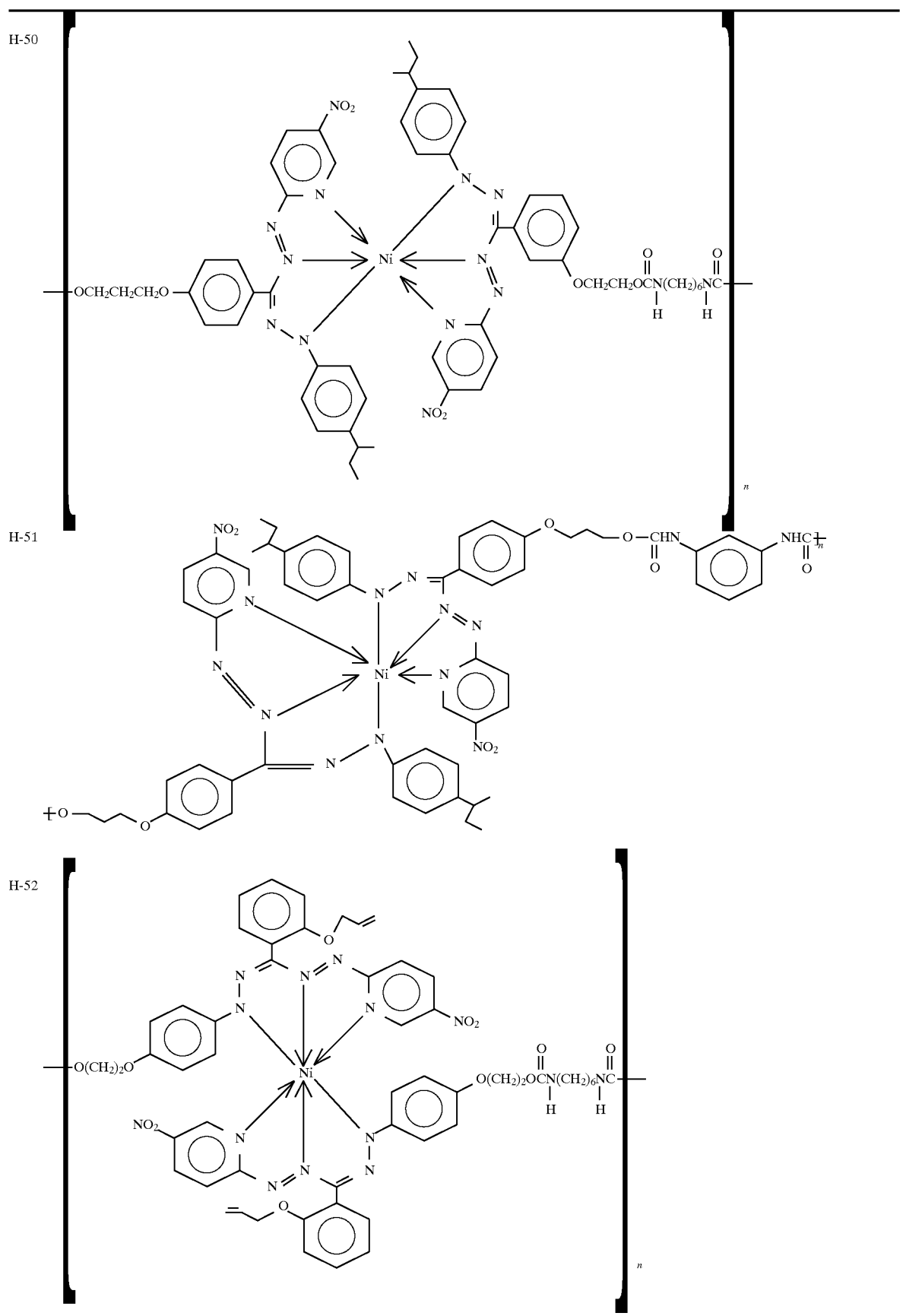

TABLE 2-continued
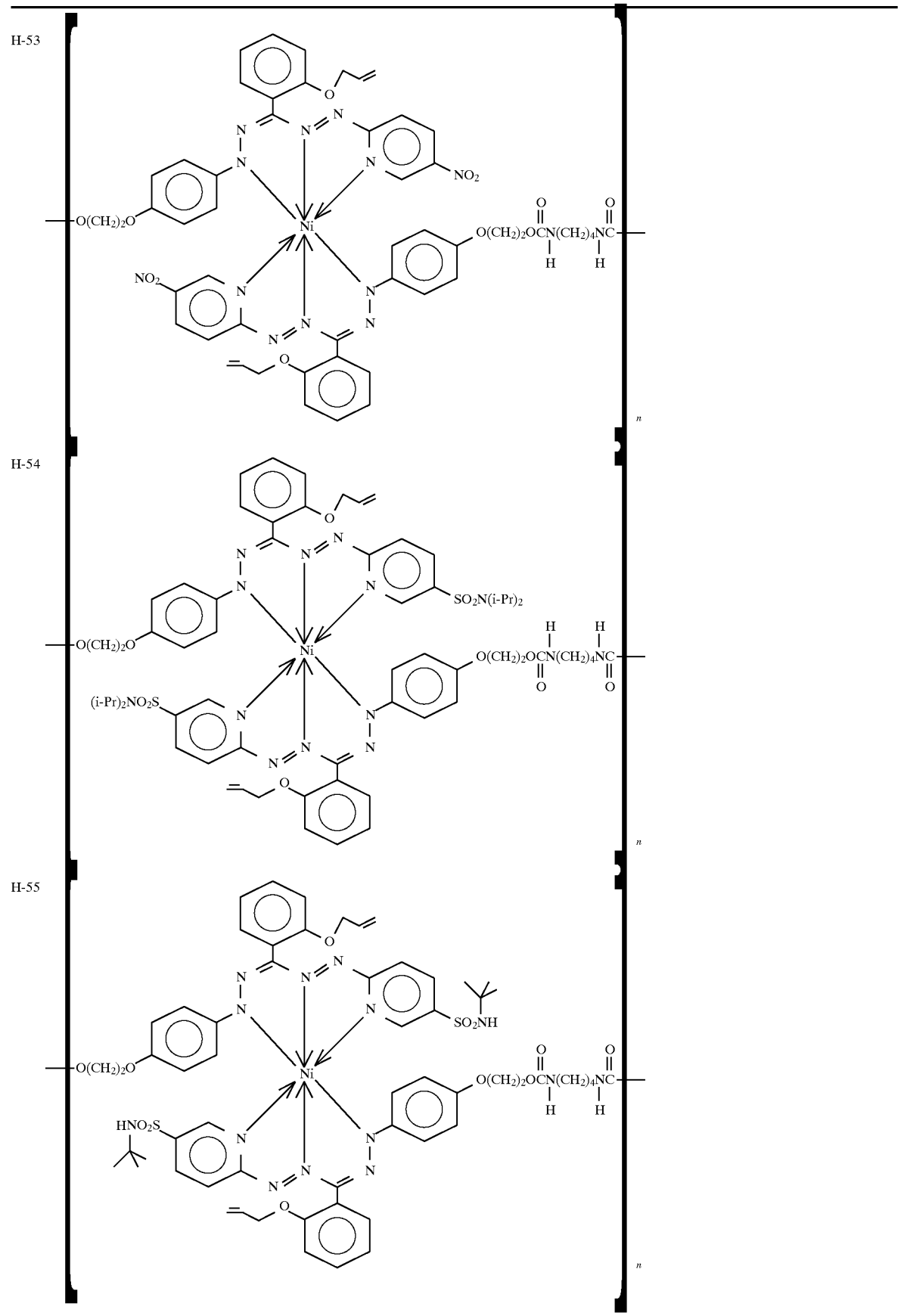

TABLE 2-continued
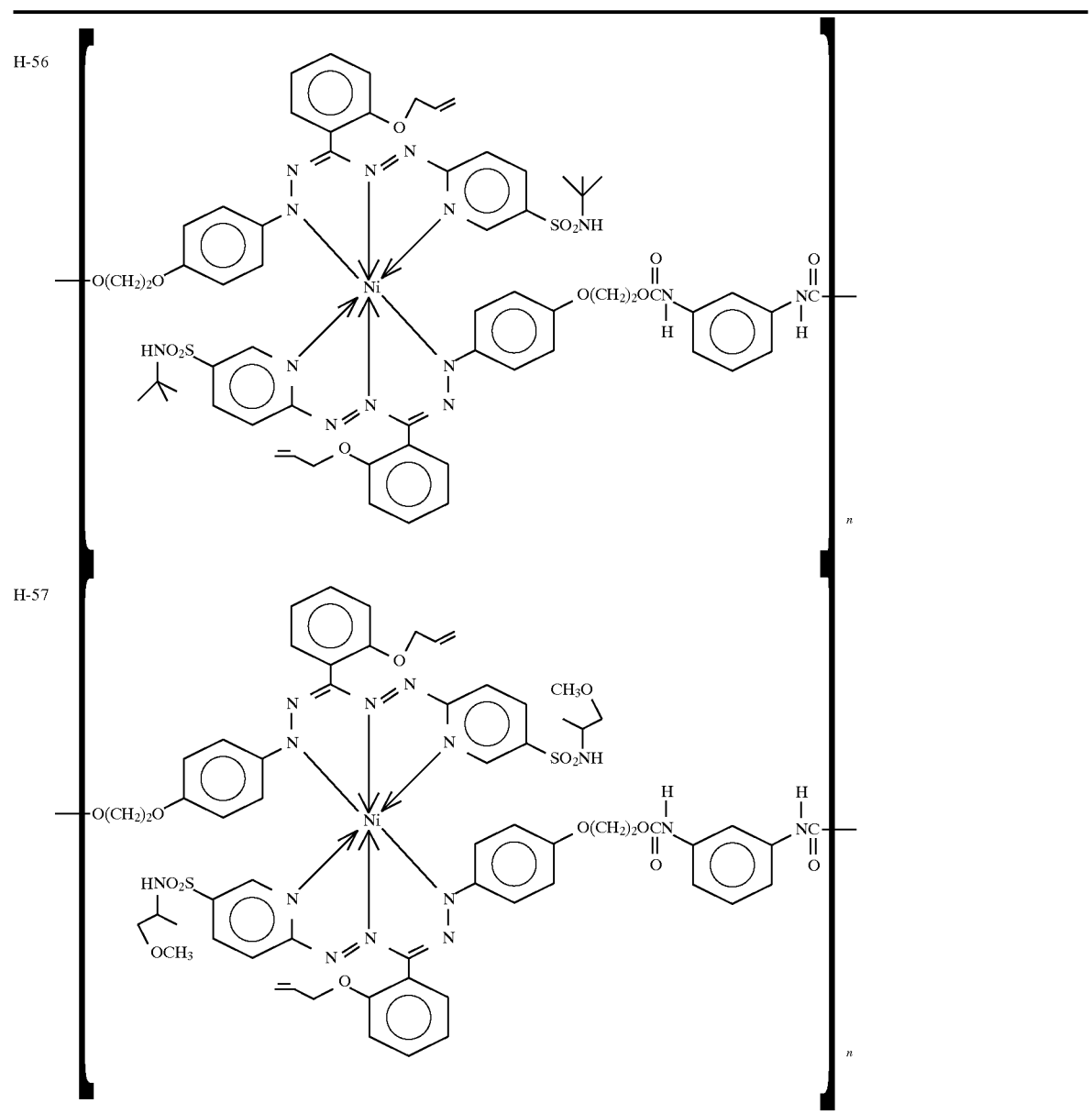

TABLE 2-continued
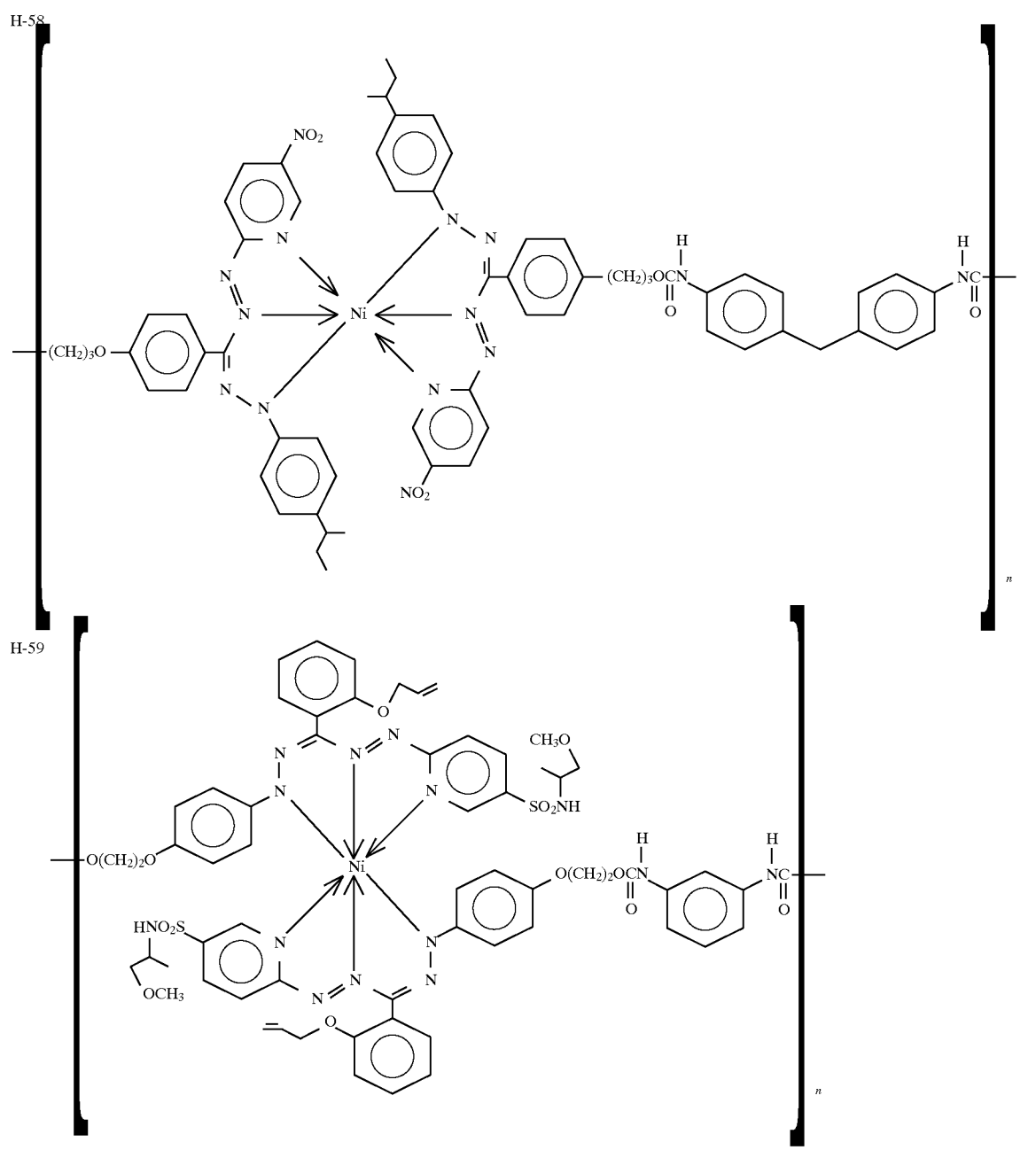

TABLE 2-continued
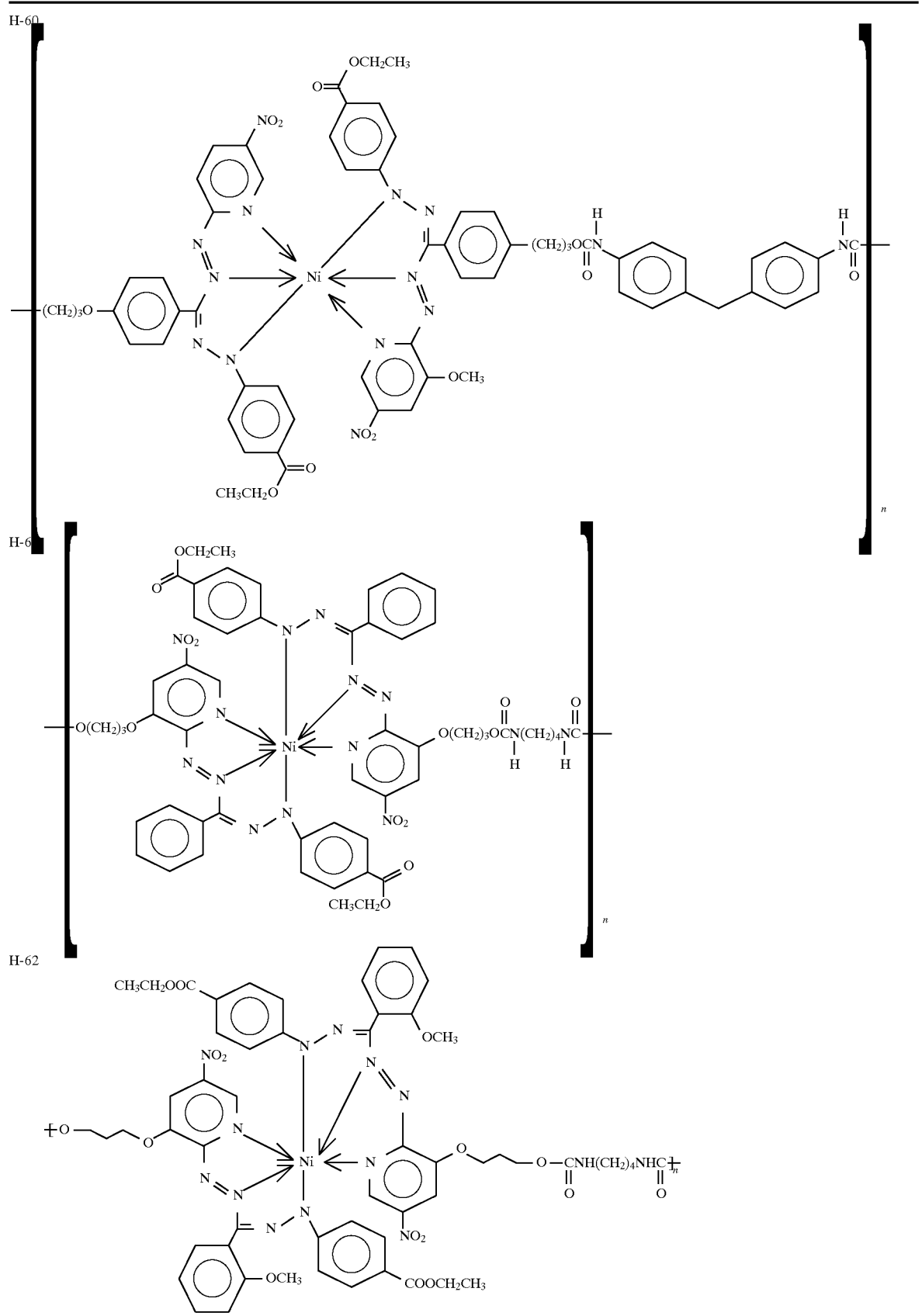

TABLE 2-continued
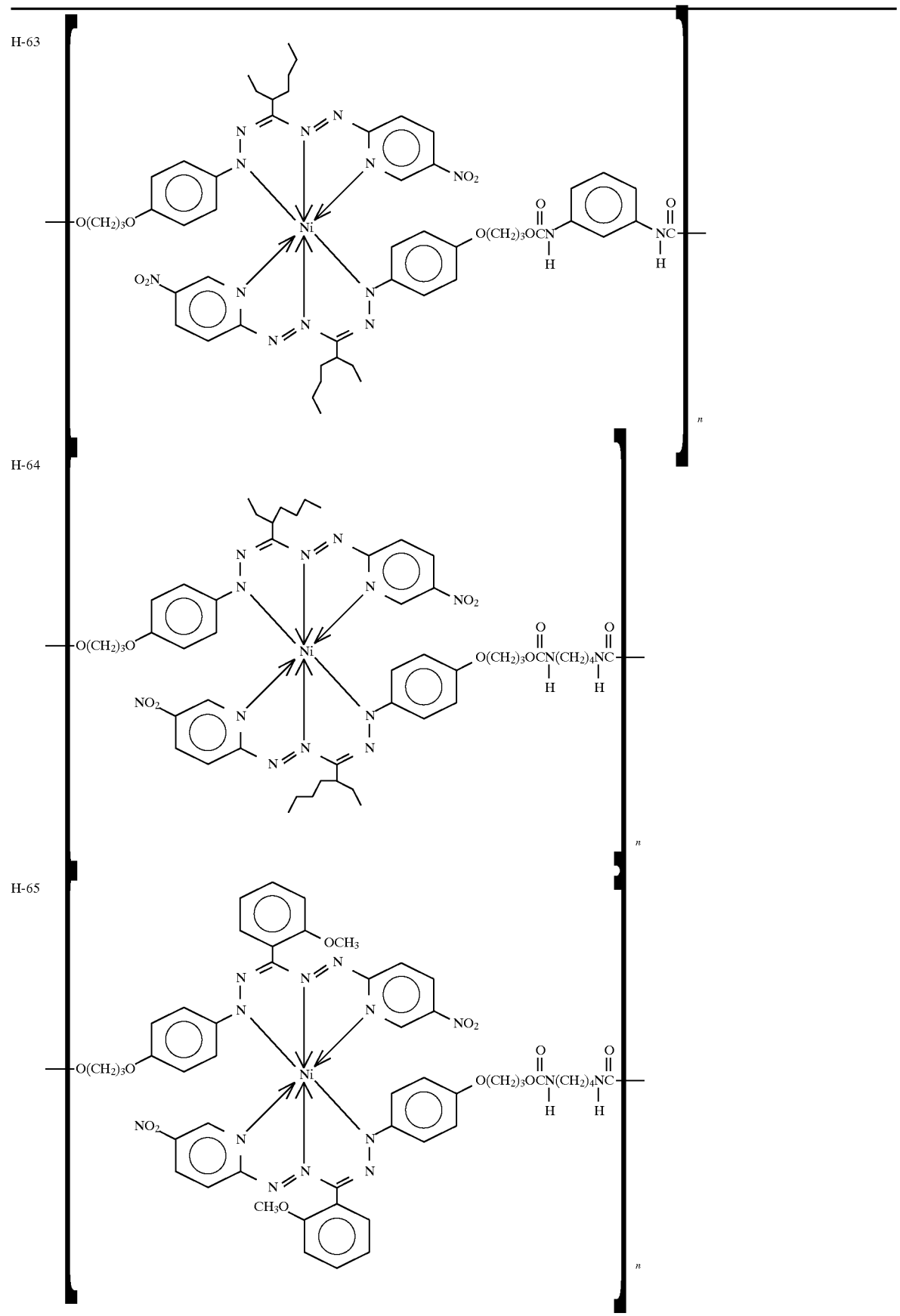

TABLE 2-continued
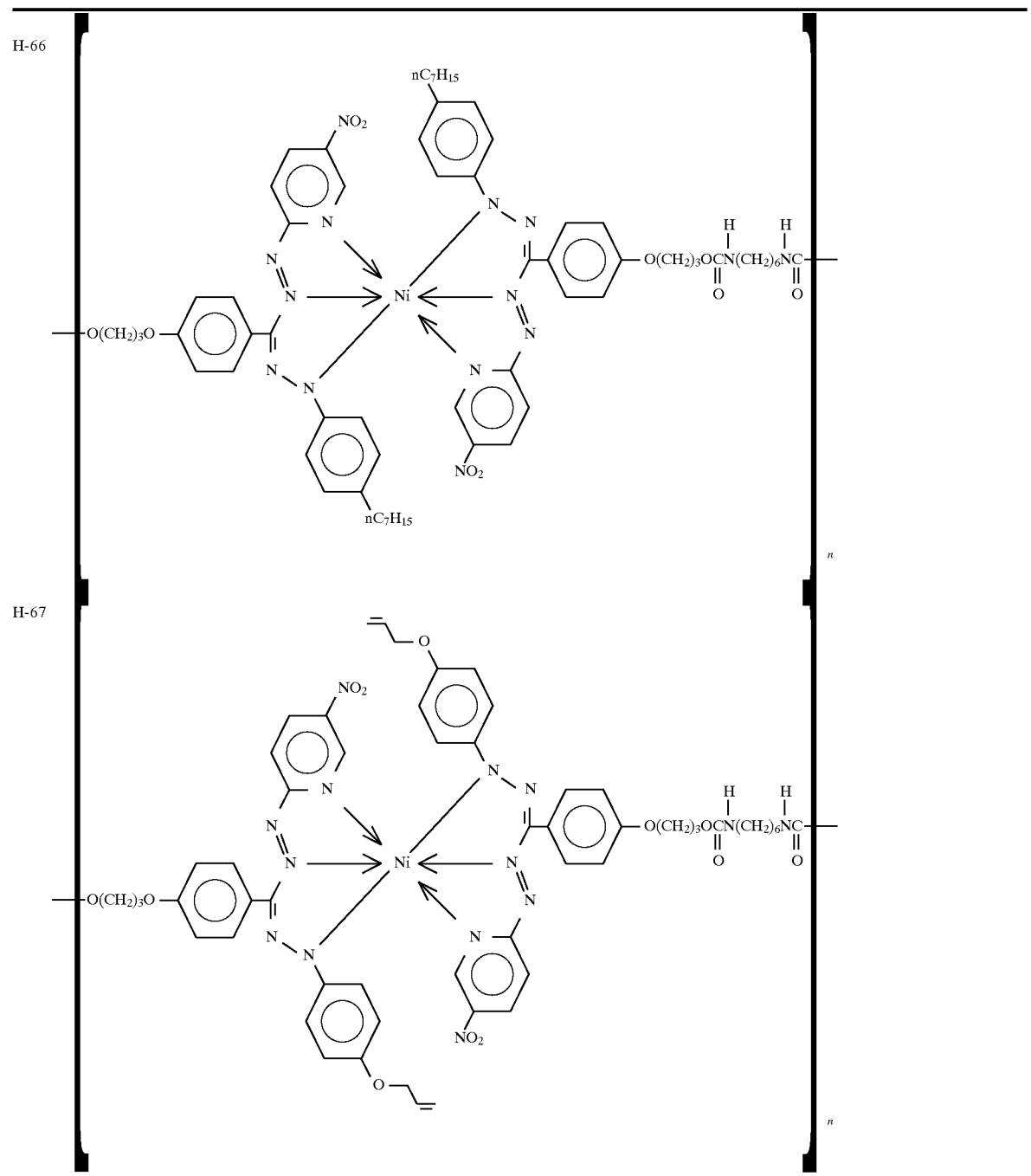

TABLE 2-continued
H-68
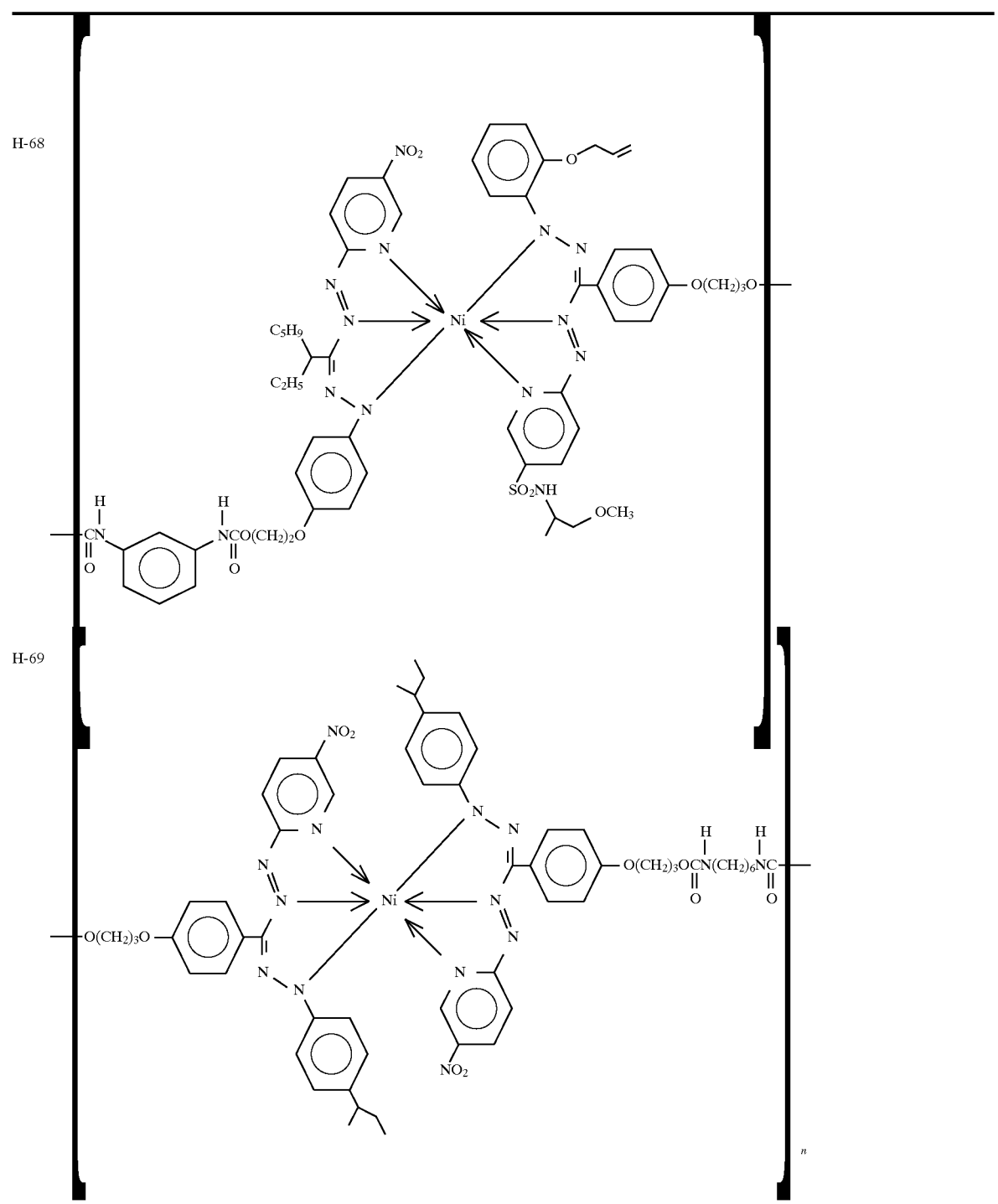
H-69

TABLE 2-continued
H-70
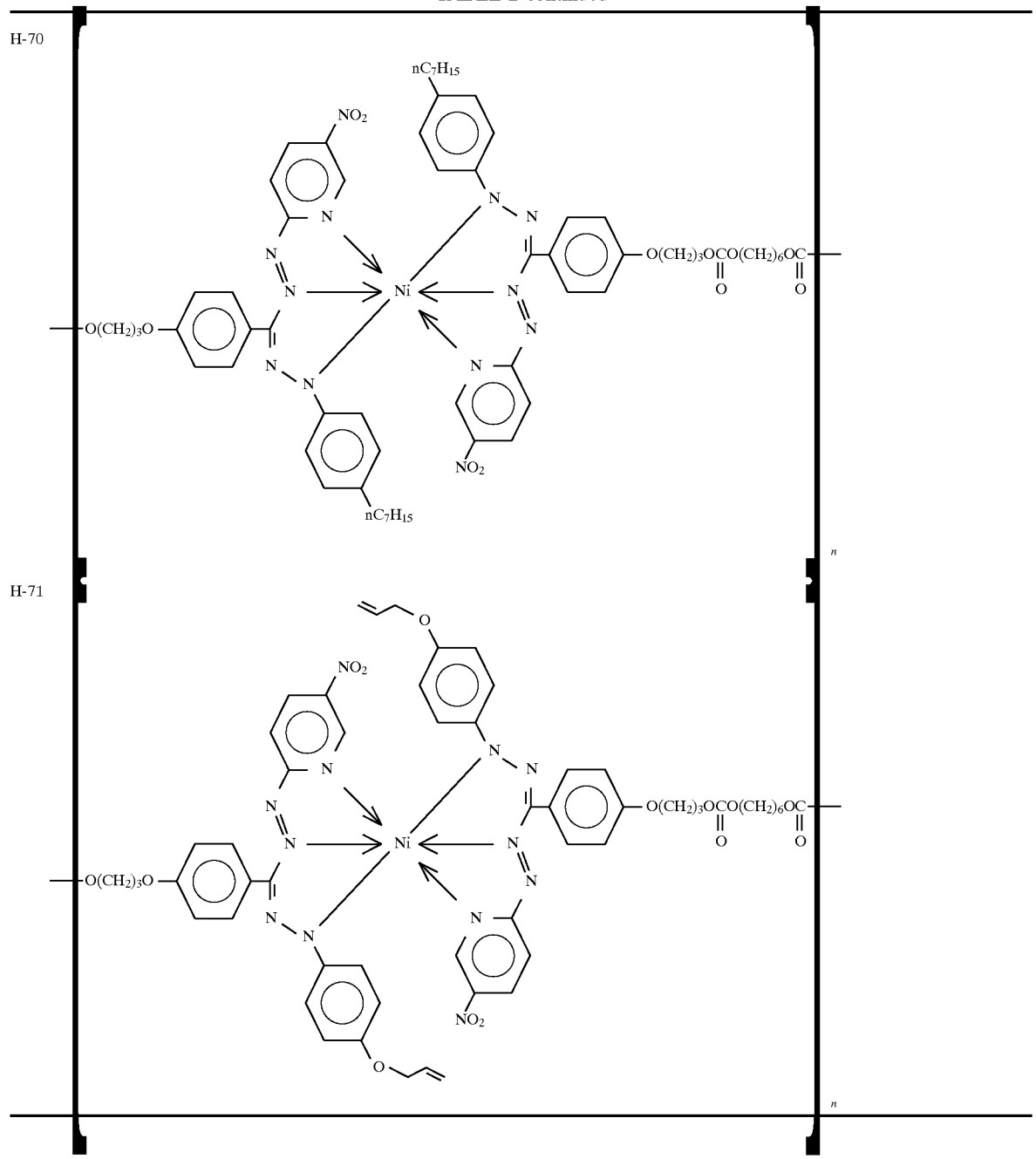
H-71
C. Polymers comprising divalent Azoether Dye Radicals
Useful polymers within the scope of Formula I wherein $Z_1$ is a divalent azoether dye radical can be derived from the azoether dyes of Formula VII:

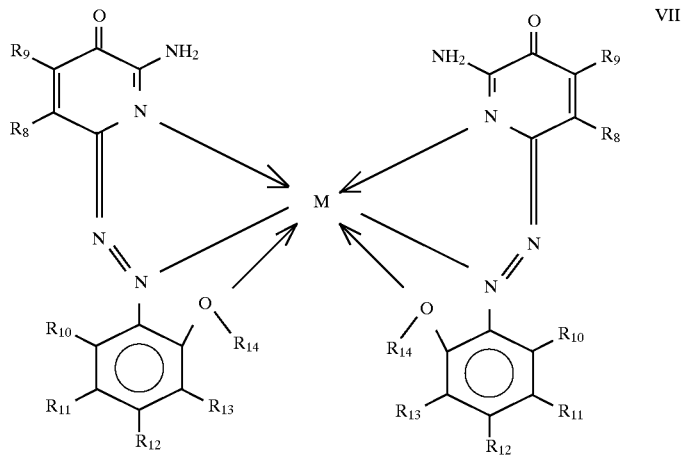

VII wherein $R_8$ represents hydrogen, halogen such as fluorine, chlorine and bromine, $C_1$ to $C_{10}$ alkylsulfonyl, and sulfamoyl;

$R_9$ represents hydrogen and $C_1$ to $C_6$ alkyl;

and $R_8$ and $R_9$ may be taken together to form an aromatic ring such as phenyl;

M represents a divalent metal ion such as Ni, Zn and the like; and

Useful polymers within the scope of Formula I wherein $Z_1$ is an azoether dye radical are represented by Formula VIII:

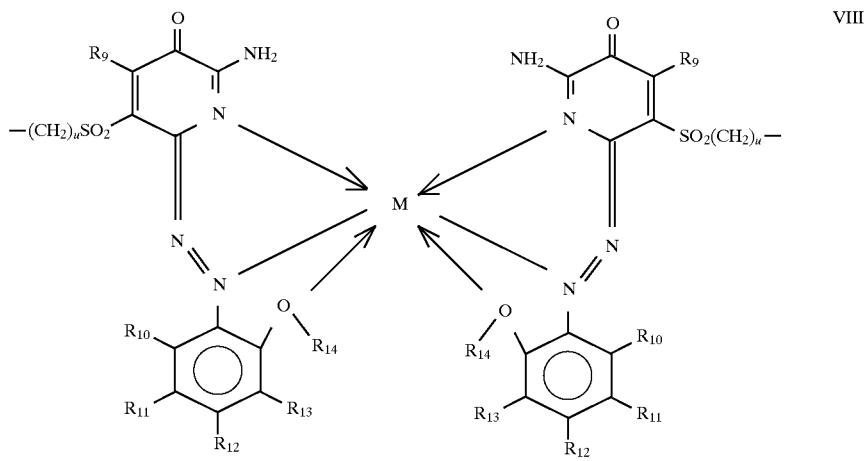

VIII $R_{10}$ and $R_{13}$ represents hydrogen, $C_1$ to $C_4$ alkyl and halogen such as fluorine, chlorine and bromine;

$R_{11}$ represents hydrogen, $C_1$ to $C_6$ alkyl, nitro, $C_1$ to $C_6$ alkoxy, halogen, $SO_2R_{40}$ in which $R_{40}$ represents $C_1$ to $C_{10}$ alkyl; substituted and unsubstituted benzyl such as 4-methoxybenzyl, $C_6$ to $C_{10}$ aryl; $C_5$ to $C_{10}$ hetaryl such as thienyl;

and $R_{10}$ and $R_{11}$ may be taken together to form an aromatic ring such as phenyl;

$R_{12}$ represents an electron withdrawing group such as nitro, cyano, $SO_2R_{40}$;

$R_{13}$ represents hydrogen, $C_1$ to $C_4$ alkyl and halogen such as fluorine, chlorine and bromine;

$R_{14}$ represents $C_1$ to $C_6$ alkyl, $C_3$ to $C_6$ alkenyl, substituted and unsubstituted benzylgroup such as para-t-butylphenyl, $C_6$ to $C_{10}$ aryl such as phenyl; $C_4$ to $C_{10}$ hetaryl such as thienyl, $C_5$ to $C_{10}$ hetarylmethyl such as thienylmethyl, and $-(CH_2)_jR_{18}$ in which j is an integer from 1 to 5 and $R_{18}$ represents cyano and $COOR_{15}$ in which $R_{15}$ represents $C_1$ to $C_{10}$ alkyl;

wherein u represents an integer from 2 to 10.

Method of Making Azoether Dye Monomer

2-Hydroxy-4-nitroaniline (34 g) was placed in a round bottom flask together with DMF (300 ml), potassium carbonate (8.7 g) and potassium iodide (0.4 g) and the mixture heated at 80° with stirring. 4-t-butylbenzyl chloride (50 g) was added dropwise and heating continued for 4 hours. At the end of this time the mixture was added to ice and stirred vigorously. After the product solidified it was filtered off and washed with dilute sodium hydroxide solution followed by water. The product was purified by recrystallization from ethanol. The nmr spectrum of the dried material was in accord with 2-(4-t-butylbenzyloxy-4-nitroaniline. The yield was 30 g of material suitable for use without further purification.

Next, the 2-(4-t-butylbenzyloxy-4-nitroaniline (35 g) was diazotized with isopentyl nitrite in a mixture of acetic and propionic acids. After 2 hours at 5° C. any excess nitrous acid was destroyed by the addition of urea and the diazo solution was added to a solution of 2-amino-5-bromo-3- hydroxy-4-methylpyridine hydrochloride (27 g) in methanol (500 ml.) containing sodium acetate (30 g) below 5° C. When dye formation was complete the solution was diluted with water and the product 2-amino-6-(2-[4-t-butylbenzyloxy]-4-nitrophenylazo)-5-bromo-3-hydroxy-4-methylpyridine was filtered off.

The above bromo compound (33 g) was dissolved in DMF (200 ml) and treated with sodium 3-hydroxypropylsulfinate (13.8 g) and the mixture stirred for five hours. The product was isolated by pouring the mixture into water containing 4 ml conc. HCl and filtering off the precipitated material.

The dye (32 g) was added to methanol (500 ml) and nickel acetate (7.1 g) added in portions with stirring while heating the solution at gentle reflux for 3 hours. The solution was allowed to cool and the product filtered off.

Polymers according to Formula VII are presented in Table 3.

TABLE 3

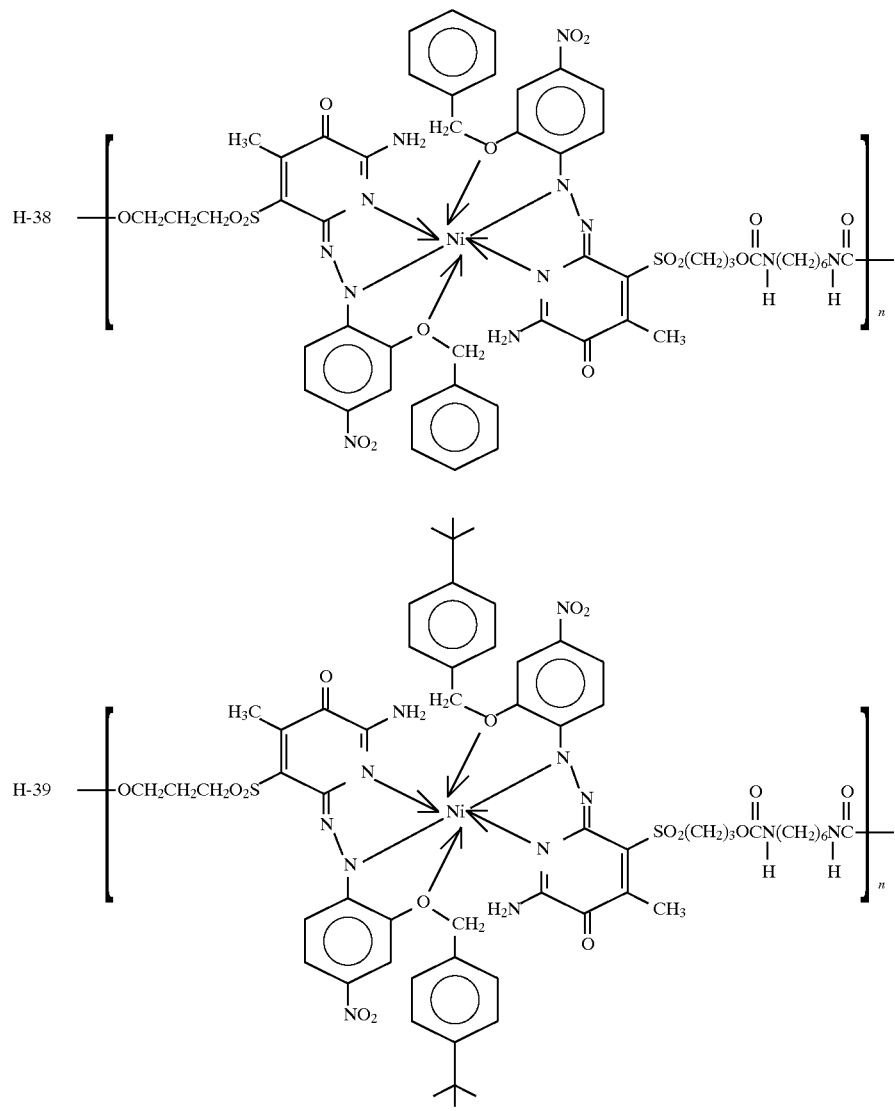

TABLE 3-continued
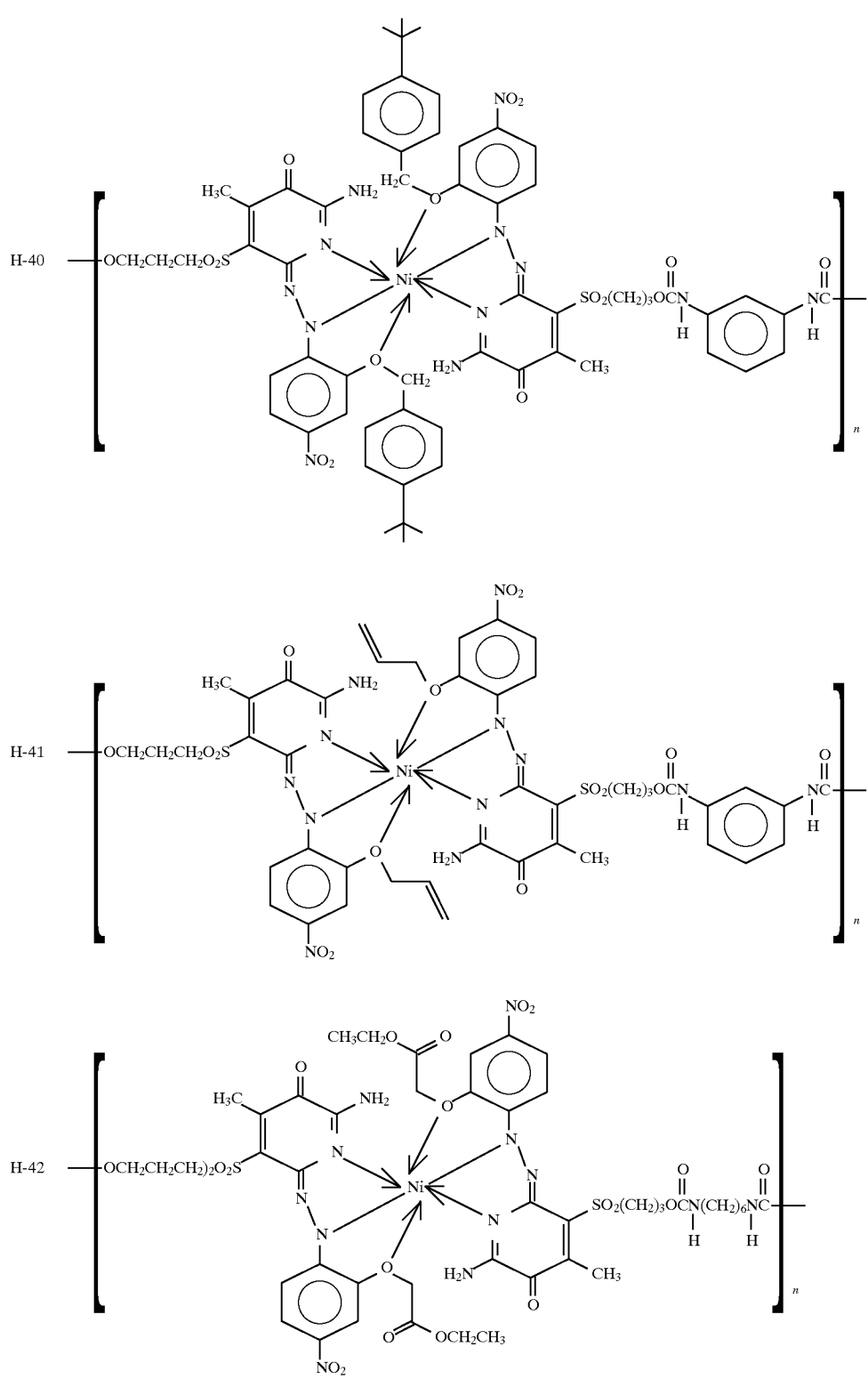

TABLE 3-continued
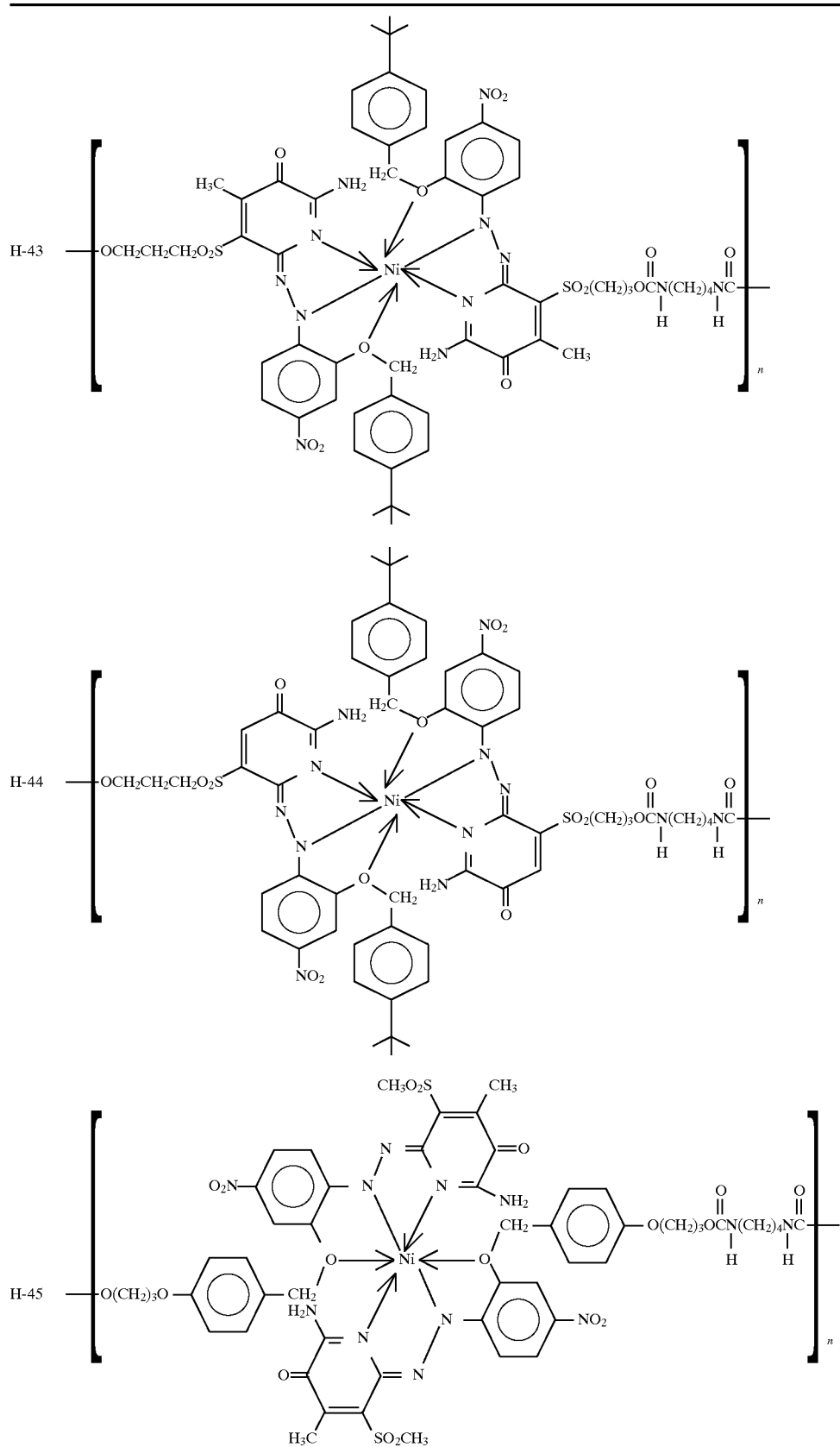

TABLE 3-continued

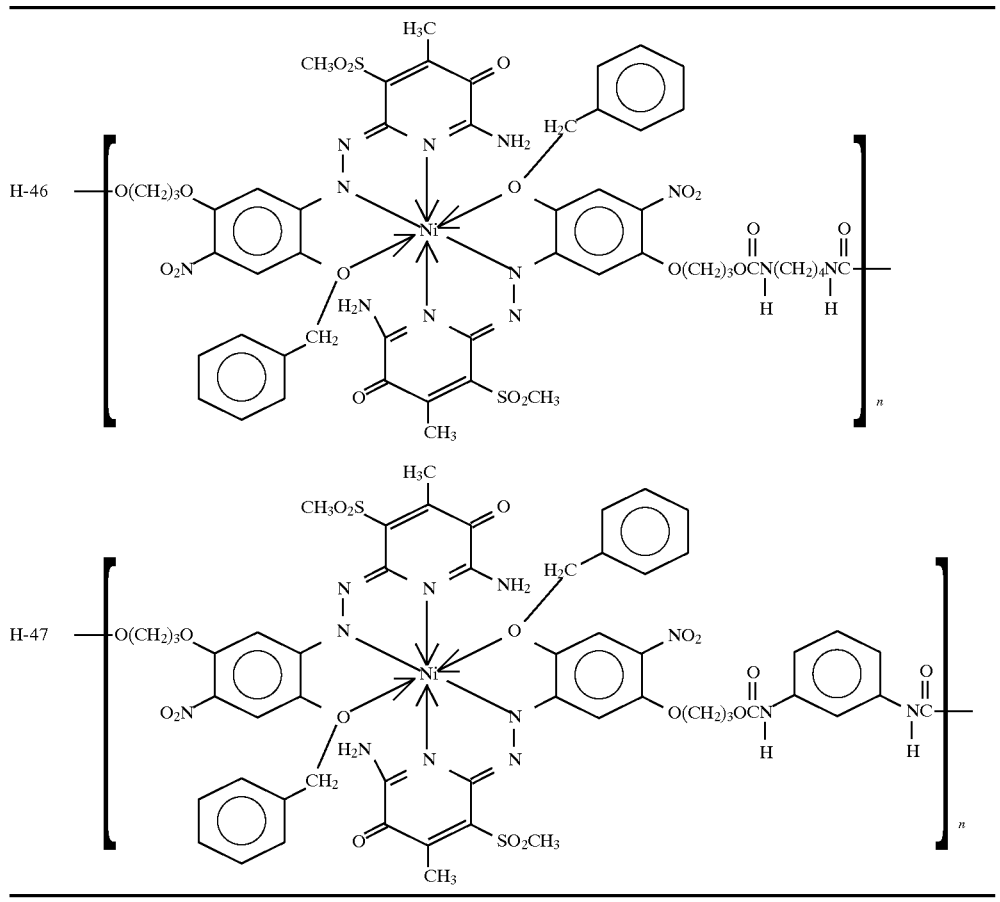

D. Polymers comprising divalent Anionic Azo Dye Radicals
Useful polymers within the scope of Formula I wherein $Z_1$ is a divalent anionic azo dye radical can be derived from the anionic azo dyes of Formula IX:

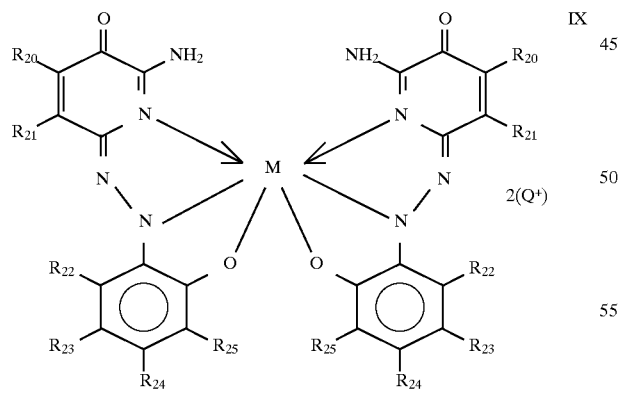

$R_{20}$ represents hydrogen and $C_1$ to $C_6$ alkyl;
$R_{21}$ represents an $C_1$ to $C_{10}$ alkyl, $SO_2R_{20}$; and
$R_{20}$ and $R_{21}$ may be taken together to form an aromatic ring such as phenyl;
$R_{22}$ represents hydrogen, $C_1$ to $C_{10}$ alkyl, and halogen such as fluorine, chlorine and bromine;
$R_{23}$ represents hydrogen, $C_1$ to $C_{10}$ alkyl, nitro, $C_1$ to $C_{10}$ alkoxy, halogen such as fluorine, chlorine and bromine and $SO_2R_{40}$;

and $R_{22}$ and $R_{23}$ may be taken together to form a fused aromatic ring such as phenyl;

$R_{24}$ represents an electron withdrawing group selected from nitro, cyano, $SO_2R_{40}$, and $SO_2NR_{41}R_{42}$ in which $R_{41}$ and $R_{42}$ represent hydrogen, $C_1$ to $C_{10}$ alkyl, substituted and unsubstituted benzyl such as paramethoxybenzyl, and $C_6$ to $C_{10}$ aryl such as phenyl;

$R_{25}$ represents hydrogen, $C_1$ to $C_4$ alkyl and halogen such as fluorine, chlorine and bromine;

M represents a divalent metal ion such as Ni, Zn and the like; and

Q represents Na, Li, $N(R_{30})_4$ in which $R_{30}$ represents $C_1$ to $C_6$ alkyl.

Method of Preparation for Anionic Azo Dye Monomers

The monomers necessary to prepare the polymeric Anionic Azo Dyes described in Table 7 can be synthesized by the general procedure described below. This particular procedure gives rise to the monomer necessary to prepare the polymeric Dye H-112.

The coupler, 5-bromo-4-methyl-2-amino-3-pyridinol was prepared in 3 steps from 4-methyl-2-amino-3-pyridinol. The 4-methyl-2-amino-3-pyridinol was prepared from 4-methyl-pyridine N-oxide using the procedure described in J. Med. Chem. 1987, 30, 2041–2042.

The appropriate 2-hydroxyaniline (0.87 mole) was dissolved in a mixture of water (90 mL) and conc. HCl (27 mL) and the solution cooled to <5°. A solution of sodium nitrite (6.51 g) in water (15 mL) was added slowly and the diazonium solution stirred at ice bath temperature for 2 hours. 5-Bromo-4-methyl-2-amino-3-pyridinol (17 g) was dissolved in methanol (600 mL) containing anhydrous sodium acetate (110 g) and the solution cooled to 0°. The diazonium solution was added slowly to the coupler solution and the reaction mixture stirred at room temperature for 2 hours and then diluted with water and the dye removed by filtration. The solid was washed well with water and dried in a vacuum oven at 50°.

The above bromo compound was dissolved in DMF (700 mL) and the appropriate solid sodium alkanesulfinate (10% excess) added and the mixture stirred at room temperature for 4 hours. The reaction was monitored by TLC and when the starting material had disappeared, the reaction mixture was poured on to ice and water (1.2 L). After stirring overnight the solid was collected by filtration, washed well with water and dried.

This dye was added to methanolic tetrabutylammonium hydroxide (140 mL of 1M solution) and diluted with methanol. Solid nickel acetate dihydrate was added in portions and the metallization monitored by TLC. When no unmetallized dye was observed, the reaction mixture was poured into water (1.5 L) and stirred overnight. The product was filtered off, washed with water and dried in the vacuum oven.

Polymers according to Formula IX are presented in Table 4.

TABLE 4

H-112

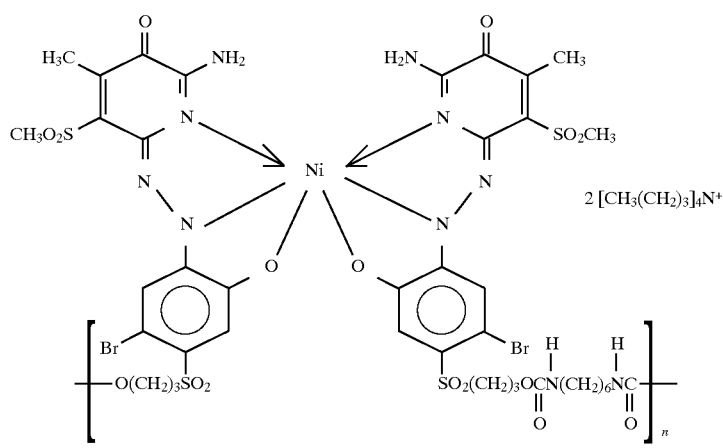

H-113

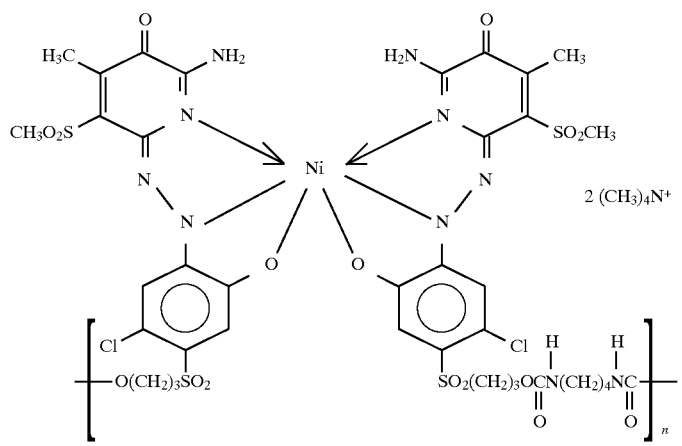

TABLE 4-continued
H-114
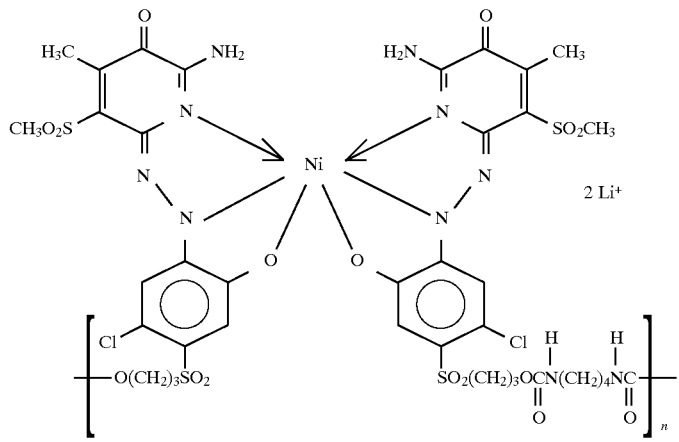
H-115
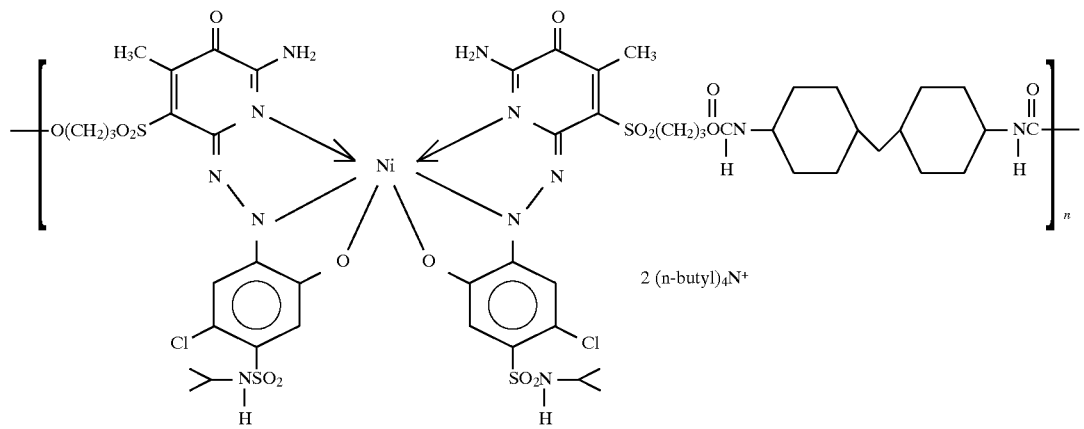
H-116
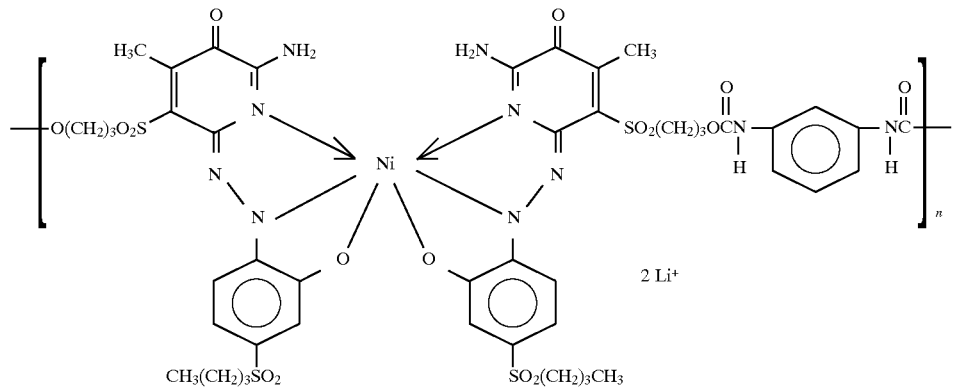

TABLE 4-continued
H-117
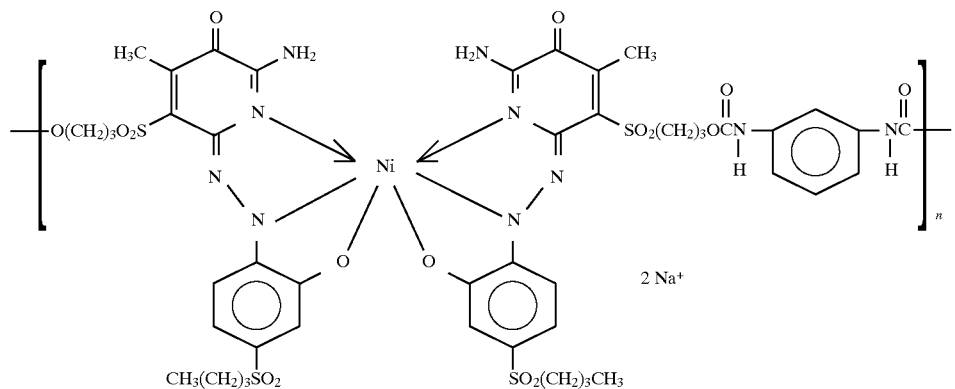
H-118
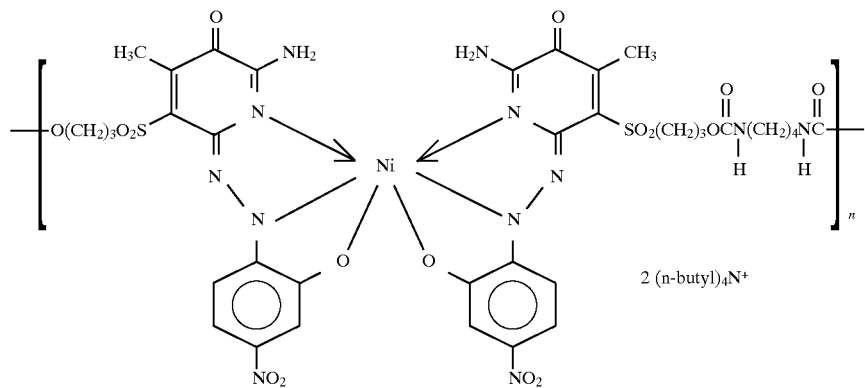
H-119
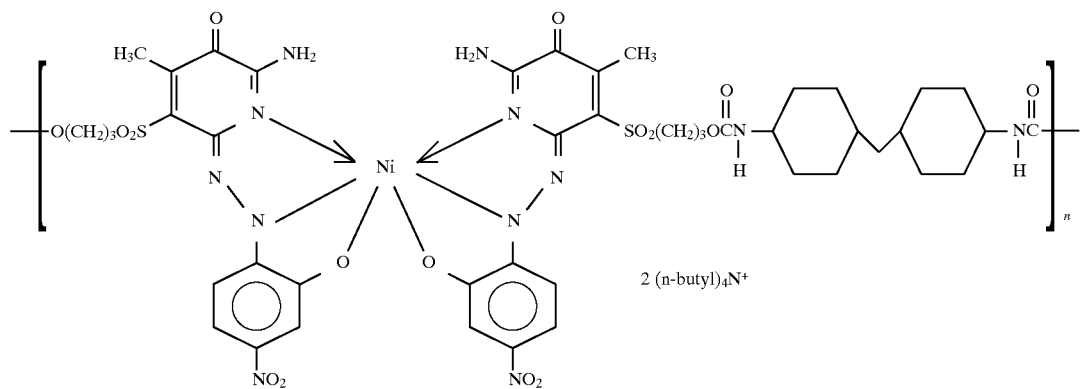

TABLE 4-continued

H-120

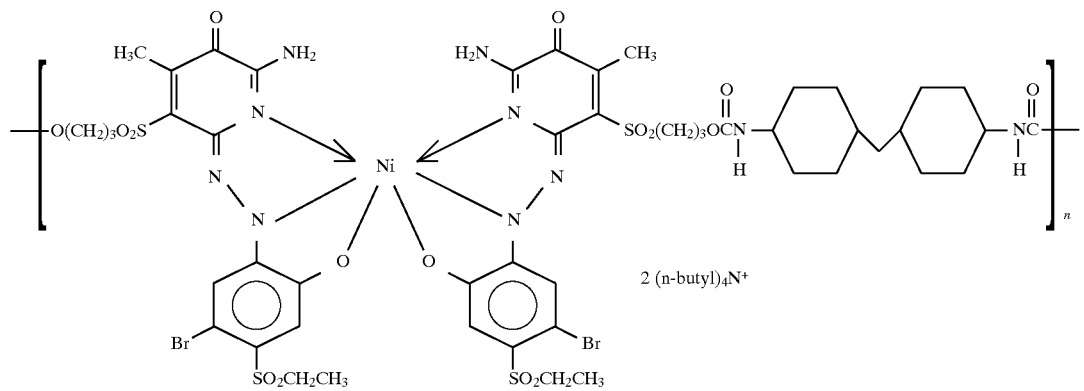

E. Polymers comprising divalent Azo Dye radicals

Useful polymers within the scope of Formula I wherein $Z_1$ is a divalent azo dye radical can be derived from the azo dyes of Formula X:

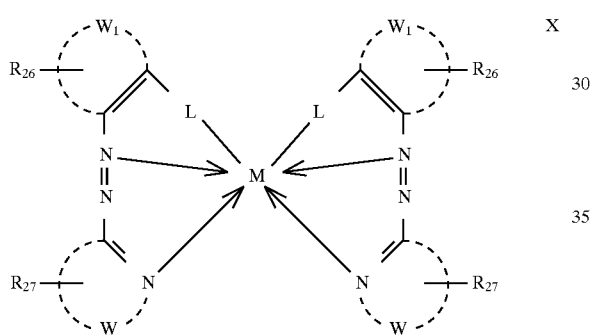

W represents sufficient atoms to form a mono and bicyclic heterocyclic ring such as pyridyl and benzothiazolyl;

$W_1$ represents sufficient atoms to form an aromatic ring such as phenyl and naphthyl;

L represents $O^-$, $SO_3^-$, and $CO_2^-$;

$R_{26}$ and $R_{27}$ represent hydrogen, $C_1$ to $C_{10}$ alkyl, $C_6$ to $C_{10}$ aryl such as phenyl, $C_1$ to $C_{10}$ alkoxy, $C_6$ to $C_{10}$ aryloxy such as phenoxy, halogen such as fluorine, chlorine and bromine, nitro and cyano;

M represents a divalent metal ion such as Ni, Zn and the like.

Azo dye diols and azo dye diamines can be prepared by the method of Example 3 in European Patent Application No. 0 483 382 A1.

Polymers containing divalent azo dye radicals are presented in Table 5.

TABLE 5

H-108

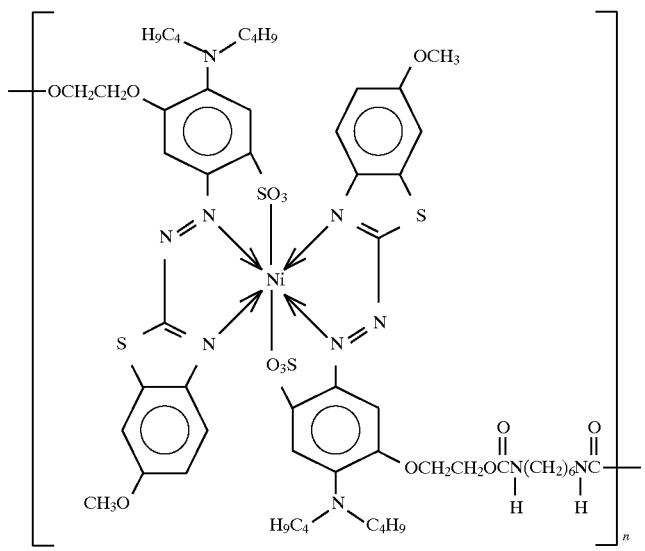

TABLE 5-continued

H-109

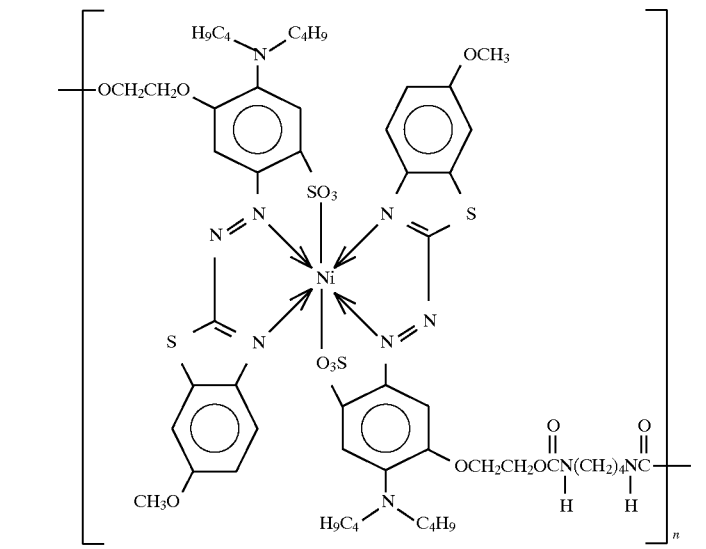

F. Polymers Comprising Divalent Phthalocyanine Dye Radicals

Useful polymers within the scope of Formula I wherein $Z_1$ is a divalent phthalocyanine dye radical can be prepared from the phthalocyanine dyes of Formula XI:

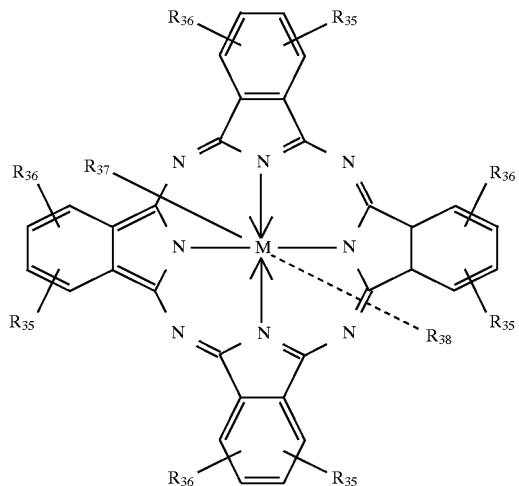

$R_{35}$ and $R_{36}$ represent hydrogen, halogen such as fluorine, chlorine and bromine, $C_1$ to $C_6$ alkyl, $C_7$ to $C_{12}$ arylalkyl, $C_1$ to $C_6$ alkoxy, $C_6$ to $C_{10}$ aryloxy and $C_1$ to $C_6$ alkylthio and $C_6$ to $C_{10}$ arylthio such as phenylthio; $R_{37}$ and $R_{38}$ represent $C_1$ to $C_6$ alkoxy; and
M represents Fe, Si, and Ge.

Useful polymers within the scope of Formula I wherein $Z_1$ is a phthalocyanine dye radical are represented by Formula XII:

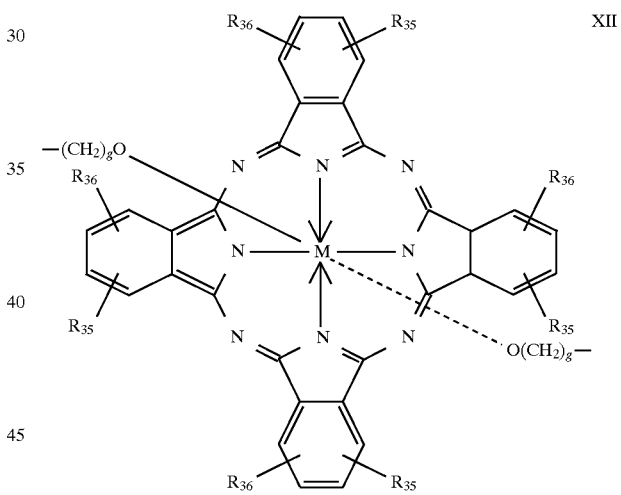

wherein
g represents an integer from 2 to 10; and
M represents Si and Ge.

A method of synthesizing polymeric phthalocyanines through the central metal atom is described in the publication of G. Meyer et al, Angew. Makromol. Chem. (1978) vol. 72 p.173–184. A method of making amine adducts of cobaltphthalocyanines is described in the publication of J. Metz and M. Hanack, Chem. Ber., (1987) vol. 120 p. 1307.

Polymers containing phthalocyanine dye radicals are presented in Table 6.

TABLE 6
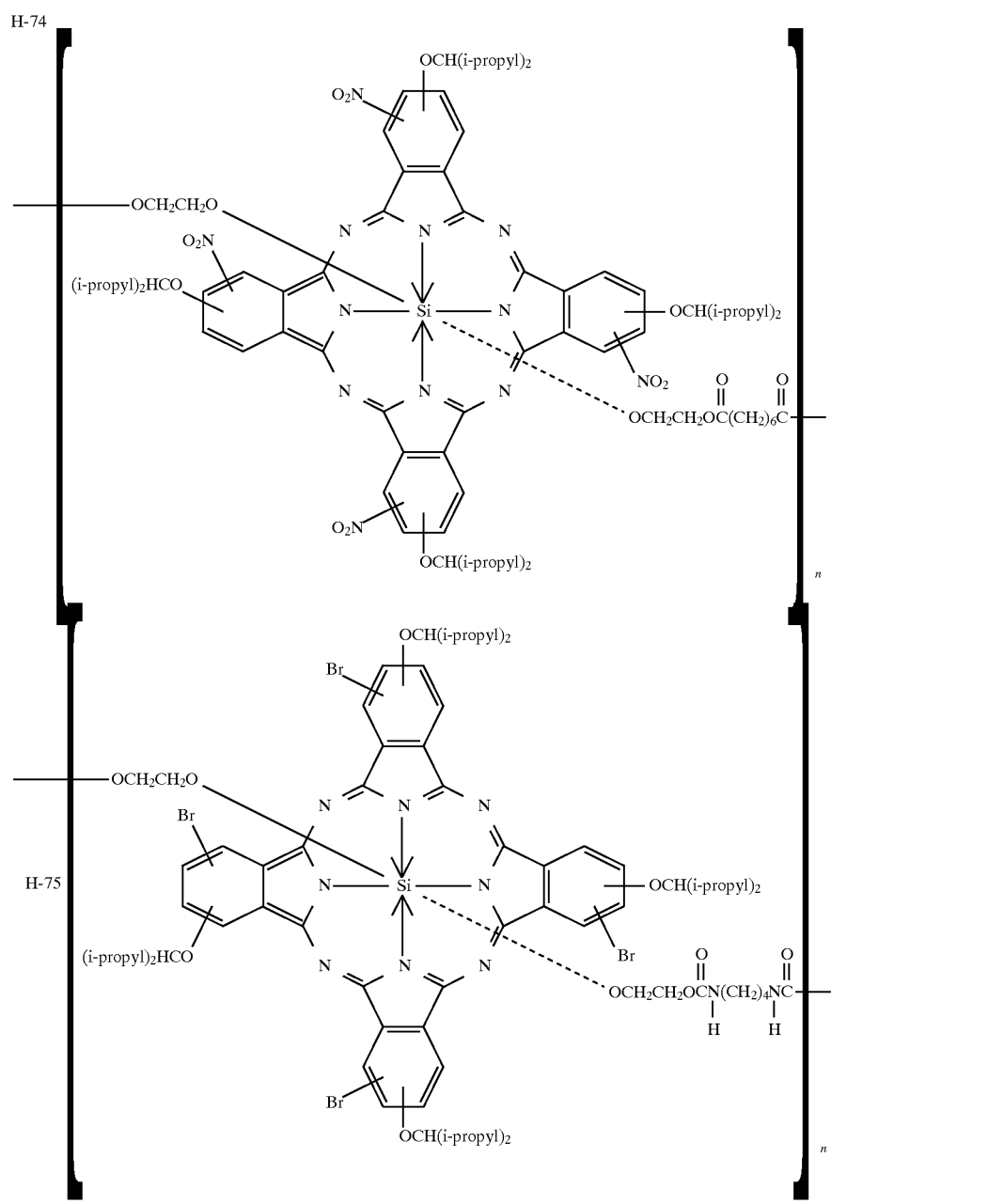

TABLE 6-continued
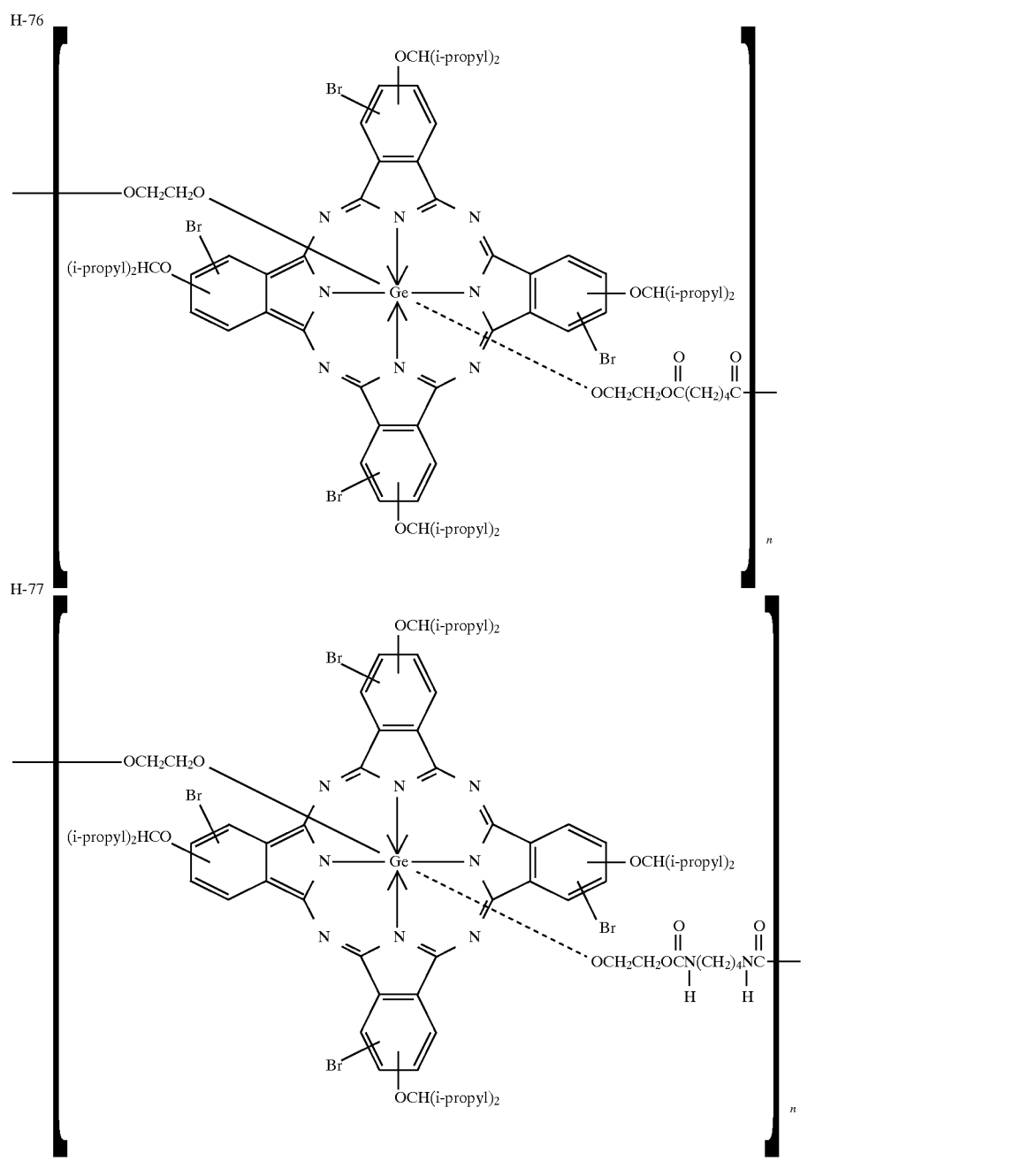

TABLE 6-continued
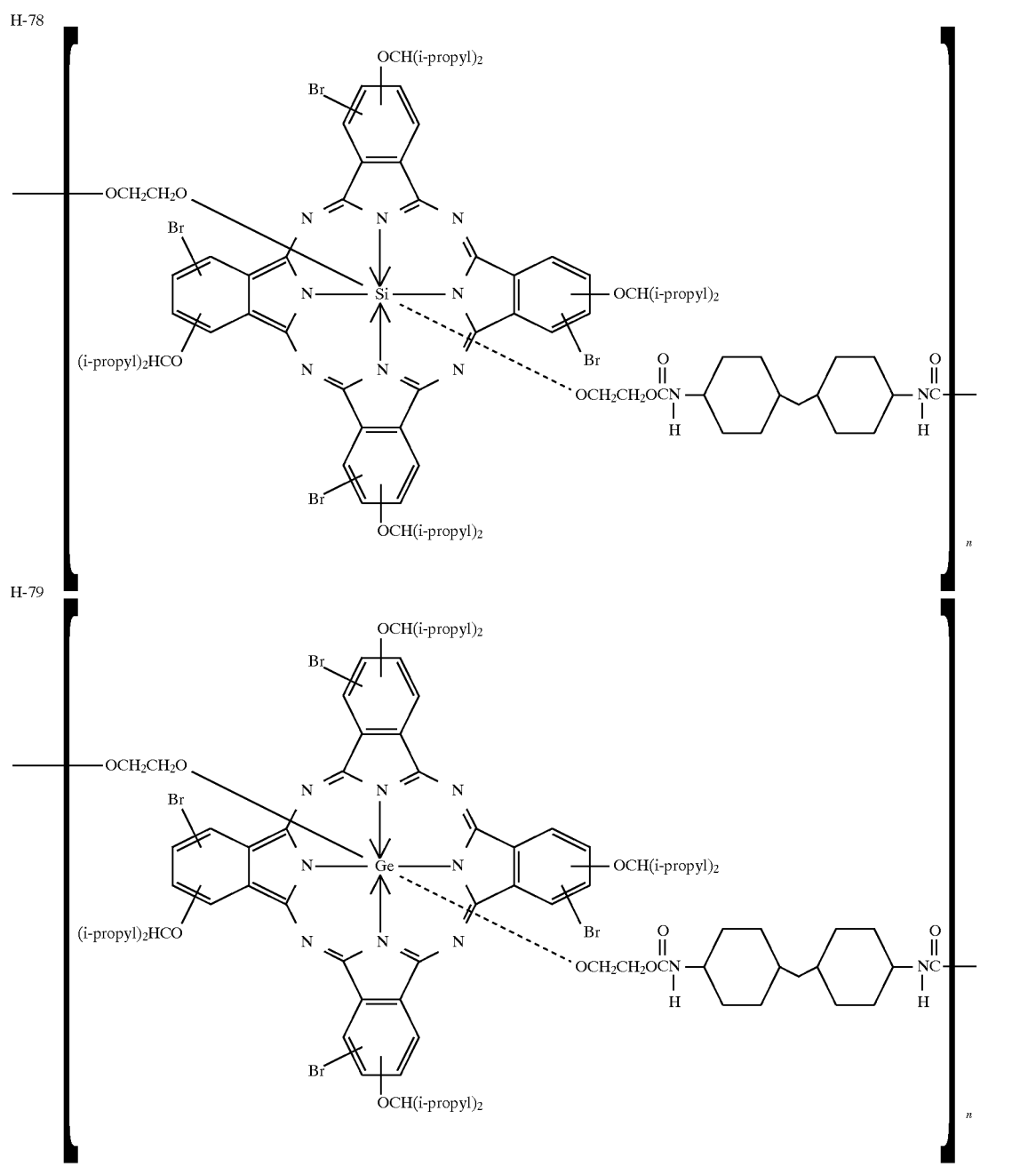

TABLE 6-continued
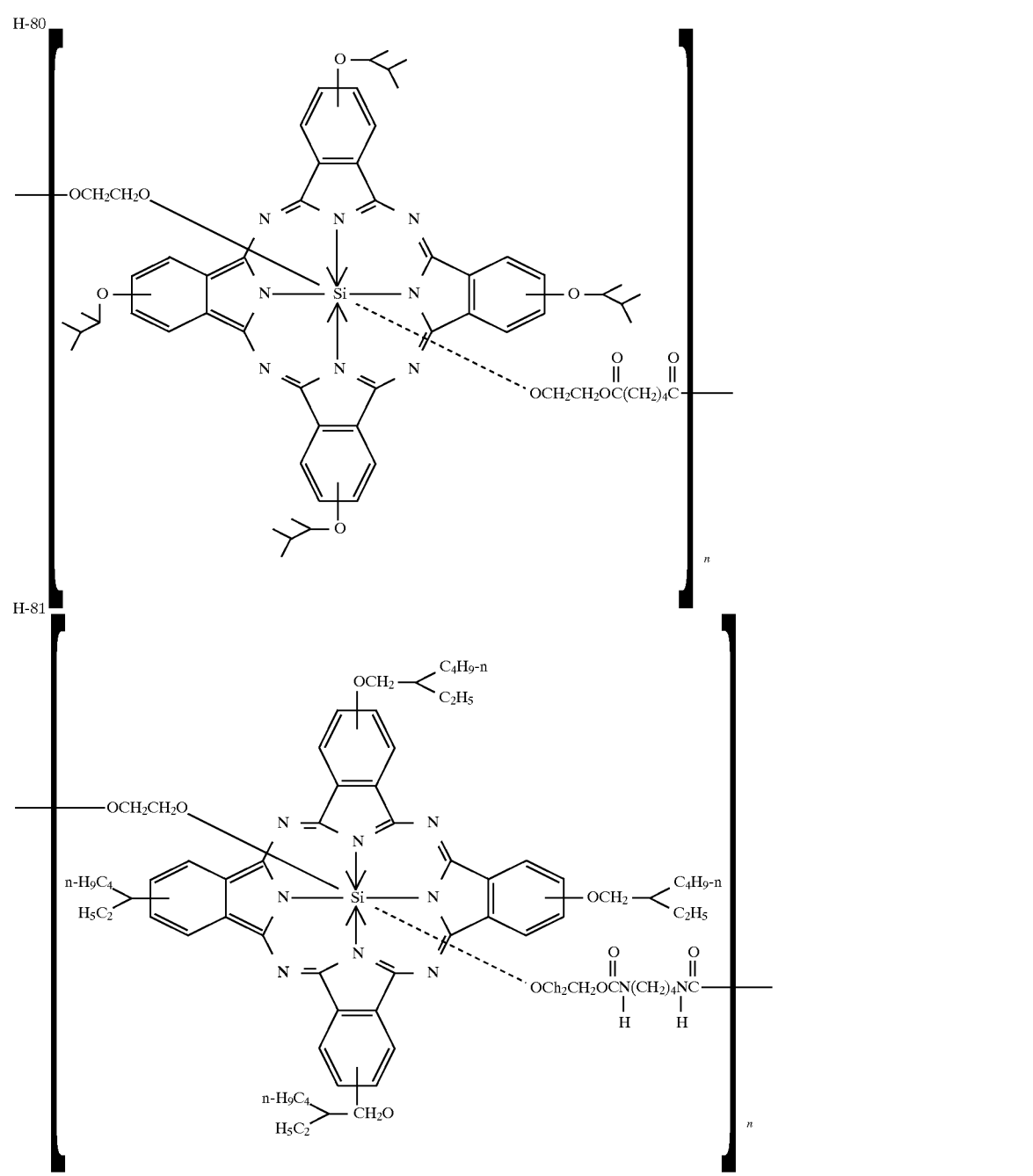

TABLE 6-continued
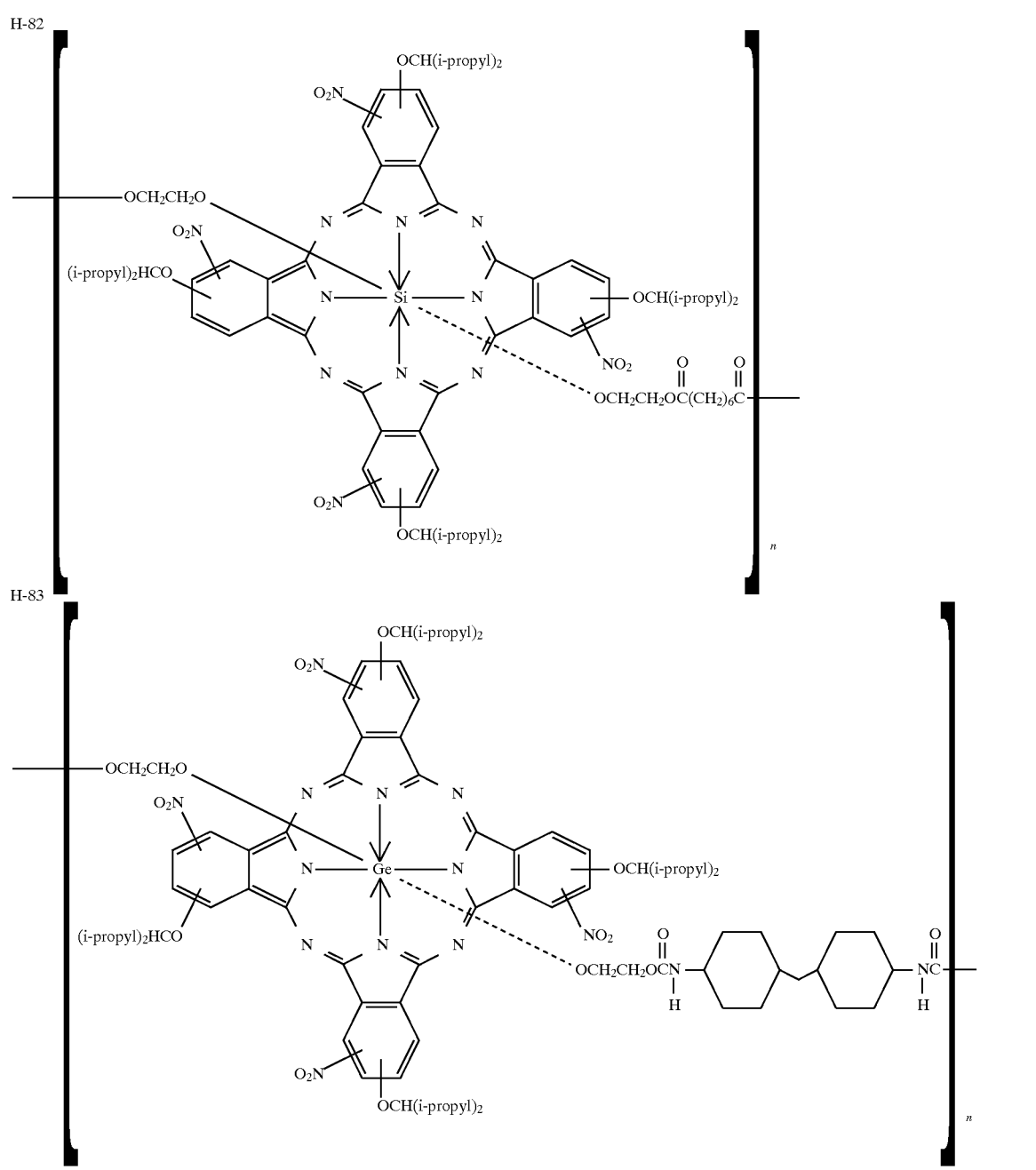

TABLE 6-continued

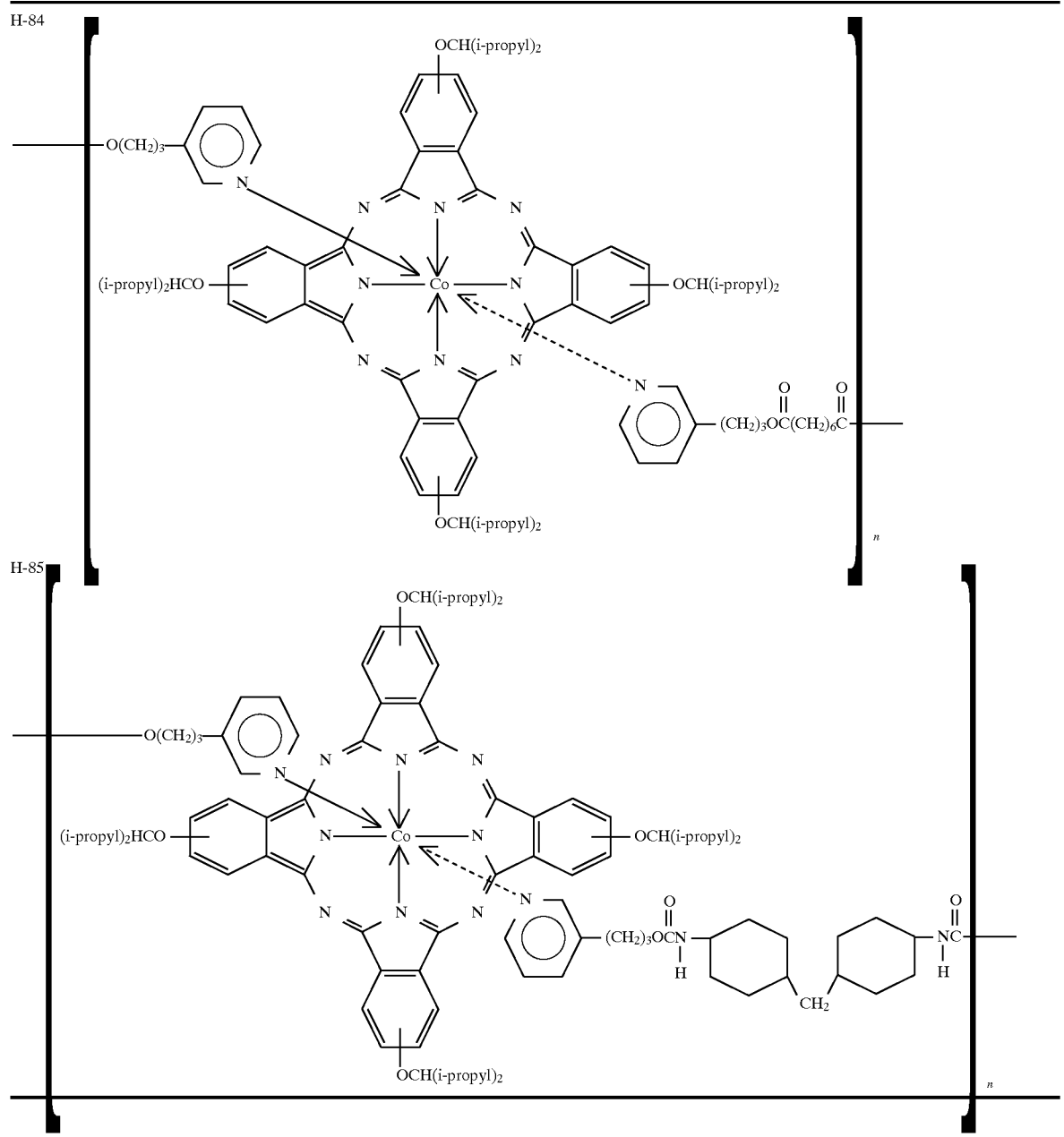

G. Polymers comprising divalent Squarilium Dye Radicals

Useful polymers within the scope of Formula I wherein $Z_1$ is a divalent squarilium dye radical can be derived from the squarilium dyes of Formula XII:

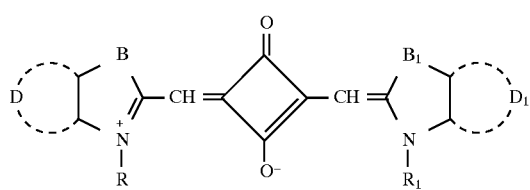

XII

B and $B_1$ represent

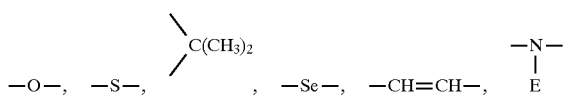

in which E represents substituted and unsubstituted $C_1$ to $C_{10}$ alkyl and an aromatic ring such as phenyl and naphthyl;

D and $D_1$ represent sufficient atoms to form a fused substituted and unsubstituted aromatic ring such as phenyl, naphthyl, tolyl or heterocyclic ring such as pyridyl;

or B may combine with D, or $B_1$ may combine with $D_1$, to form fused aromatic rings; and R and $R_1$ represent, $C_1$ to $C_{10}$ alkyl and $C_7$ to $C_{20}$ arylalkyl such as benzyl and phenethyl.

Squarilium dye diols or diamines are made by the reaction of alkoxy or alkylamine subsituted benz[e]indole quatenary salts with squaric acid in butanol under basic conditions.

Polymers containing squarilium dye radicals are presented in Table 7.

TABLE 7

H-3

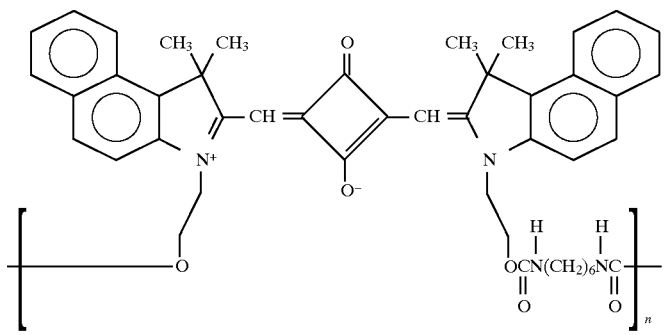

H-23

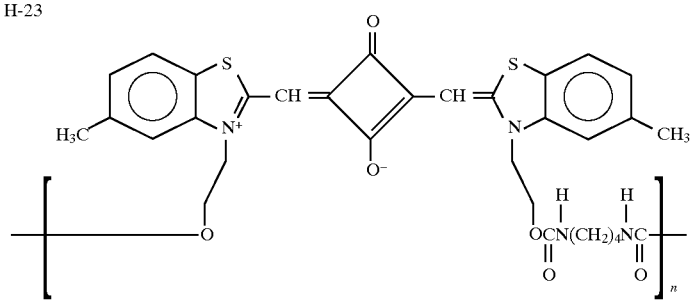

H-27

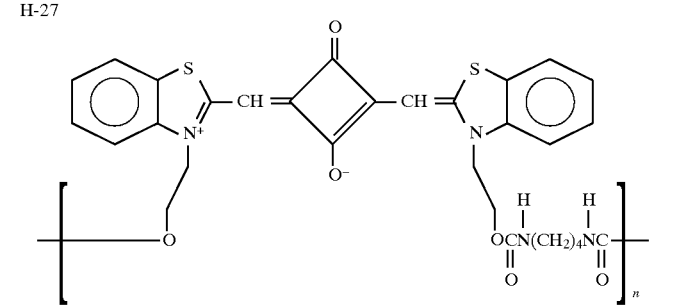

Addenda

The recording layer in the current invention, can contain, in addition to the polymers of the invention, other dyes, binders, and other addenda that improve the coatability, stability and/or performance of the recording layer.

Examples of useful addenda for the recording layer and the purposes thereof are presented in Table 8.

In Table 8 addenda S-1 and S-2 are refractive index modifiers. Addendum S-3 is a write sensitivity enhancer. Addenda S-4, S-5, S-7, S-8, S-9, S-11, S-12, S-13 are light stabilizers.

TABLE 8
Addenda
S-1
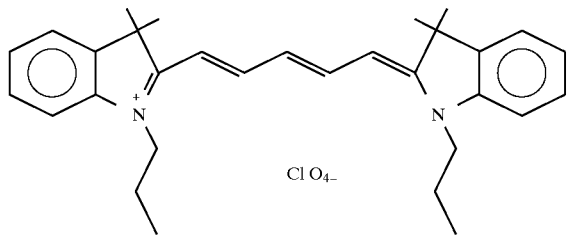
S-2
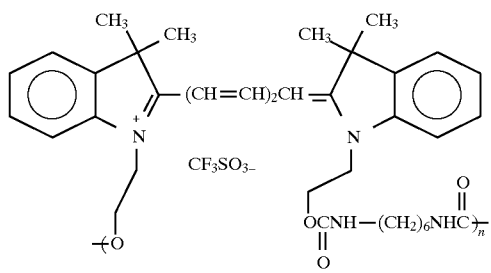
S-3
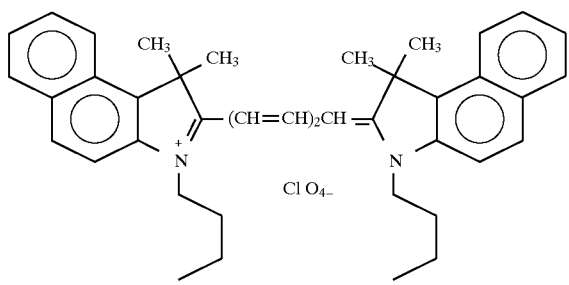
S-4
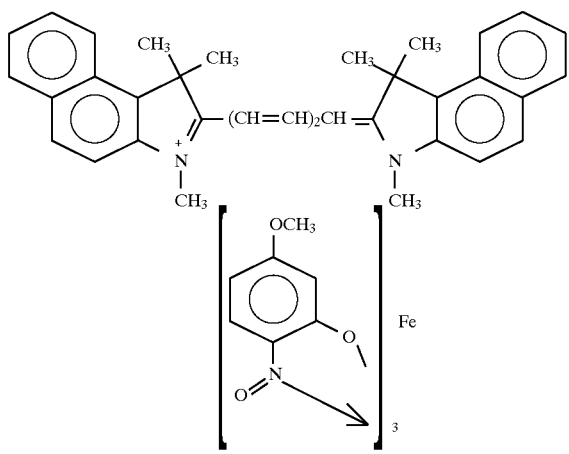

TABLE 8-continued
| Addenda |
|---|
S-5
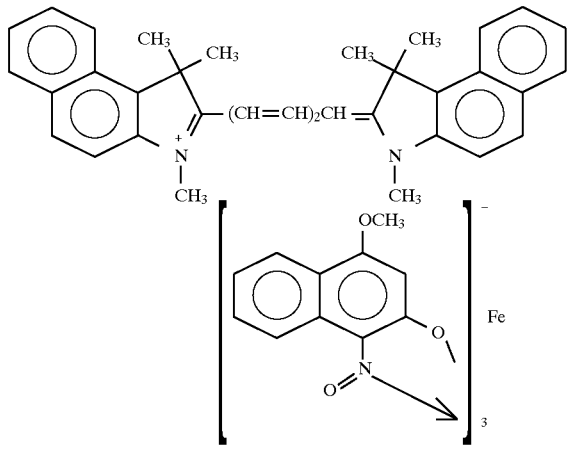
S-7
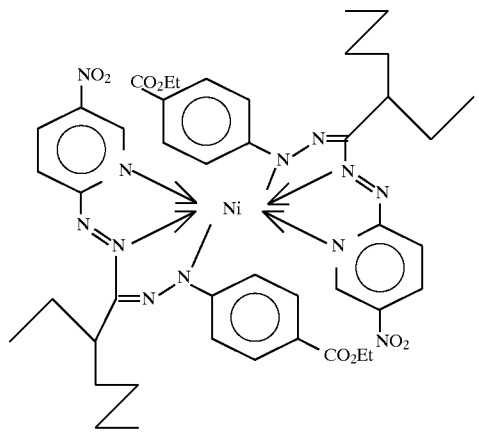
S-8
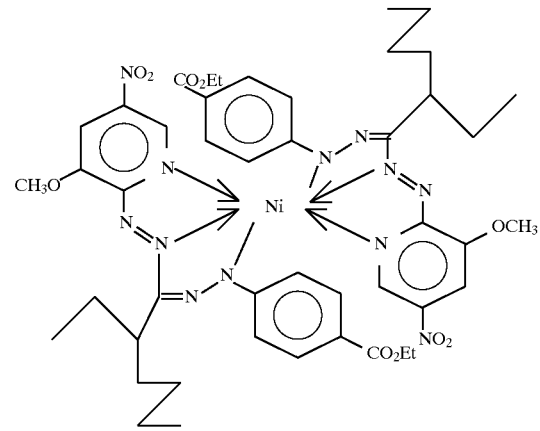

TABLE 8-continued
Addenda
S-9
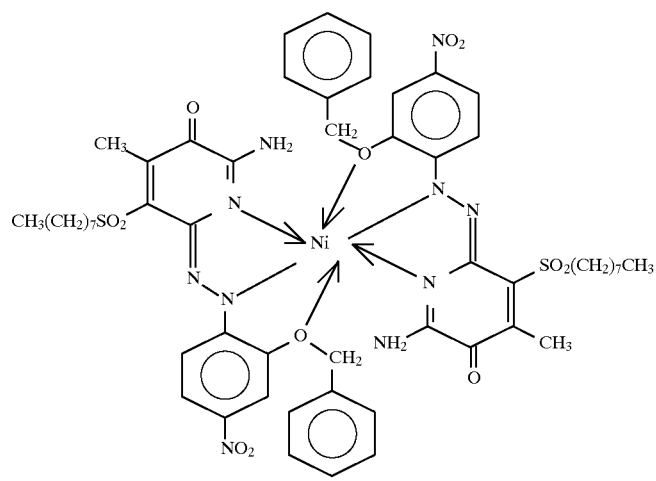
S-10
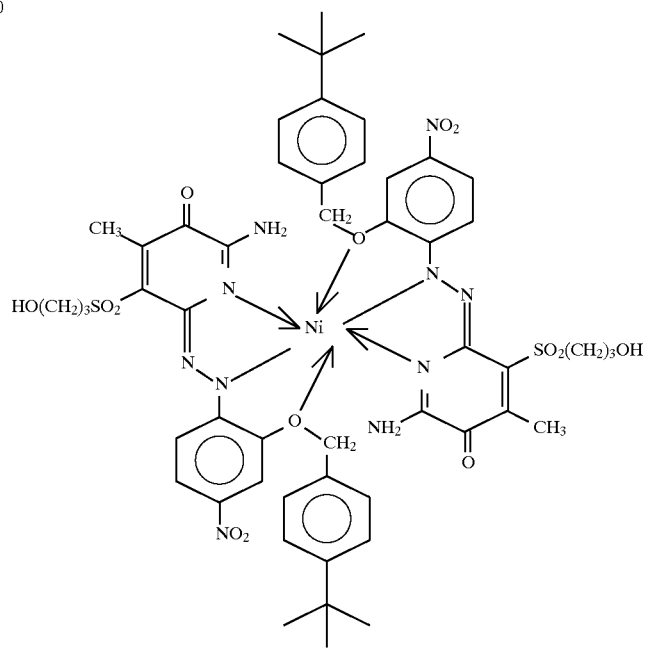
S-11
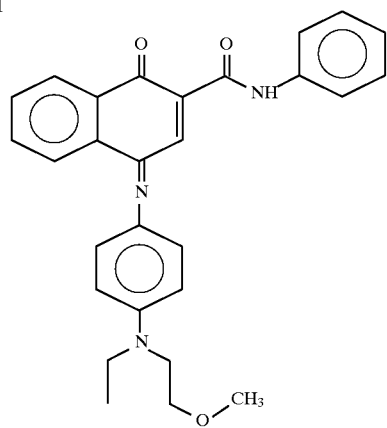

TABLE 8-continued

Addenda

S-12

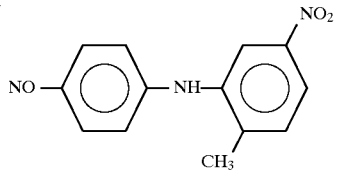

S-13

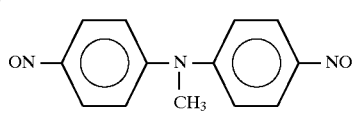

Optical Recording Elements

The medium is comprised of a light transmitting pre-grooved substrate, polymeric dye or dye mixture light absorptive layer overlaying the substrate, a light reflective layer overlaying the light absorptive layer and a lacquer protective layer overlaying the light reflective layer. The recording process generates marks of lower reflectivity than the unmarked areas of the disk when written and read with a diode laser emitting between 775 and 790 nm.

The substrate may be any transparent material that satisfies the mechanical and optical requirements. Substrates are generally pregrooved with groove depths from 30 nm to 250 nm, groove widths 0.2 to 1 $\mu$m and a pitch 1 to 2 um. The preferred material is polycarbonate, other materials are polystyrene, glass and other suitable polymeric materials.

A purpose of the polymeric dyes in the recording layer of an optical recording element is to improve the adhesive properties between the reflective layer and the recording layer and between the recording layer and the substrate and to improve the cohesive properties within the recording layer.

For the reflective layer the preferred material is gold, other material are silver, copper, aluminum, platinum, or other suitable metallic substance with sufficient reflectivity.

For the protective layer any commercial material that is used with regular CD disks can be used, such Daicure SD-17™.

The following examples demonstrate the utility of the polymers of the invention in writable CD optical recording elements.

EXAMPLE 1

A polycarbonate substrate having a thickness of 1.2 mm, an outer diameter of 120 mm and an inner diameter of 15 mm and having a spiral pregrooved formed on its surface with a width of 0.4 um, and a depth of 0.08 $\mu$m and a pitch of 1.6 $\mu$m, was made by injection molding.

To form the light absorptive layer 1 part by weight of dye H-1 of Table 1 was dissolved in 40 parts of 2,2,3,3-tetrafluoropropanol by volume with stirring for 1 hour at room temperature. Then the solution was filtered through a 0.2 mm filter. The solution was coated on the surface of the substrate by spin coating to an overall optical density of 1.25 at 671 nm. It was dried at 80° C. for 10 minutes.

Then a gold reflective layer was deposited by a resistive heating process on the entire surface of the substrate to about 120 nm thickness.

To protect the gold layer a lacquer (Daicure SD-17™) was applied by spin coating onto the gold layer to a thickness of 7 to 11 $\mu$m and it was UV cured with an 'H' bulb using a Fusion System cure at 3000 W/inch power for 15 seconds.

To test the optical recording element thus obtained, a test system consisting of an optical head with a 788 nm laser, a 0.5 NA lens, phase tracking, and ½ aperture focusing was used. The optics used circularly polarized light to reduce laser feedback effects. Recording and play back were carried out with the same laser at 2.8 m/s rotational speed. The read power was kept at 0.6 mW. Single frequency was recorded with about 3.5 micron mark length at 11 mW write power forming marks of lower reflectivity than the unmarked area when examined with a light source emitting at 788 nm light. When the marks were read the CNR (carrier signal to noise ratio), through 30 Kz filter, for this dye was 58 dB.

EXAMPLES 2 TO 8

In examples 2 to 8 the same optical recording element preparation and test method was used as in example 1. Polymeric dye numbers, molecular weights, the over all optical densities of the recording layers, and the test results are listed in Table 7.

TABLE 7

| Example No. | Table 1 Dye Structure No. | Mw/ 1000 | Index, 788 nm | OD Test | CNR mW |
|---|---|---|---|---|---|
| 1 | H-1 | 98.4 | 2.44–0.037i | 1.25 | 58.5/11 |
| 2 | H-1 | 8.1 | 2.45–0.016i | 1.26 | 59.6/11 |
| 3 | H-16 | 54 | 2.46–0.029i | 1.36 | 60.3/11 |
| 4 | H-14 | 62 | 2.30–0.017i | 1.42 | 59.0/10 |
| 5 | H-26 | 64 | 2.42–0.026i | 1.27 | 60.3/11 |
| 6 | H-28 | 10 | 2.39–0.028i | 1.26 | 59.1/11 |
| 7 | H-10 | 10 | 2.45–0.0931 | 1.30 | 59.3/11 |
| 8 | H-29 | 26 | 2.45–0.026i | 1.33 | 56.9/11 |

EXAMPLE 9

For this example the same disk substrate solvent, solution concentration (weight to volume), filter, spin coater, drying conditions, gold deposition process and testing procedure was used as in the first example. A mixture of dye H-29 of Table 1, 0.8 part and dye S-3 of Addenda Table 8, 0.2 part by weight was dissolved in 40 part by volume solvent and was coated on the grooved surface of the substrate to an optical density of 1.5 at 671 nm. On testing at 10 mW write power 55 dB CNR signal was obtained on reading.

EXAMPLE 10

For this example the same substrate solvent, solution concentration (weight to volume), filter, spin coater, drying conditions, gold deposition process and testing procedure were used as in the first example. A mixture of dye H-1 of Table 1, 0.58 part, dye S-2 of Addenda Table 8, 0.24 part and S-12 stabilizer of Addenda Table 8, 0.18 part by weight, was dissolved in 40 part by volume solvent. The solution was coated on the grooved surface of the substrate to an optical density of 1.3 at 671 nm. On testing at 15 mW write power 58 dB CNR signal was obtained on reading.

EXAMPLE 11

For this example the same substrate solvent, solution concentration (weight to volume), filter, spin coater, drying conditions, gold deposition process and testing procedure were used as in the first example. The solution made using dye H-86 of Table 1 was coated on the grooved surface of the substrate to an optical density of 1.3 at 671 nm. On testing at 14 mW write power 58 dB CNR signal was obtained on reading.

EXAMPLE 12

For this example the same substrate, solvent, solution concentration (weight to volume), filter, spin coater, drying conditions, gold deposition process and testing procedure was used as in the first example. A mixture of 0.6 part by weight dye H-1 and 0.4 part by weight of dye H-121 of Table 1 was dissolved in 40 part by volume solvent. The solution was coated on the grooved surface of the substrate to an optical density of 1.4 at 671 nm. On testing at 10 mW write power 56 dB CNR signal was obtained on reading.

EXAMPLE 13

For this example the same substrate, solvent, solution concentration (weight to volume), filter, spin coater, drying conditions, gold deposition process, and testing procedure was used as in the first example. A mixture of dye H-1 of Table 1, 0.8 part by weight, and dye S-7 of Addenda Table 8, 0.2 part by weight was dissolved in 40 part by volume solvent and was coated on the grooved surface of the substrate to an optical density of 1.4 at 671 nm. On testing at 10 mW write power 57 dB CNR signal was obtained on reading.

EXAMPLE 14

For this example the same substrate, solvent, solution concentration (weight to volume), filter, spin coater, drying conditions, gold deposition process, and testing procedure was used as in the first example. The solution made using dye H-88 of Table 1 was coated on the grooved surface of the substrate to an optical density of 1.4 at 671 nm. On testing at 10 mW write power 60 dB CNR signal was obtained on reading.

EXAMPLE 15

For this example the same substrate, solvent, solution concentration (weight to volume), filter, spin coater, drying conditions, gold deposition process, and testing procedure was used as in the first example. The solution made using dye H-89 of Table 1 was coated on the grooved surface of the substrate to an optical density of 1.3 at 671 nm. On testing at 10 mW write power 60 dB CNR signal was obtained on reading.

EXAMPLE 16

For this example the same substrate, solvent, solution concentration (weight to volume), filter, spin coater, drying conditions, gold deposition process, and testing procedure was used as in the first example. A mixture of dye H-29 of Table 1, 0.6 part and dye S-4 of Addenda Table 8, 0.4 part by weight was dissolved in 40 part by volume solvent. The solution was coated on the grooved surface of the substrate to an optical density of 1.6 at 671 nm. On testing at 10 mW write power 51 dB CNR signal was obtained on reading.

EXAMPLE 17

For this example the same substrate, solvent, solution concentration (weight to volume), filter, spin coater, drying conditions, gold deposition process, and testing procedure was used as in the first example. The solution made using dye H-90 of Table 1 was coated on the grooved surface of the substrate to an optical density of 1.3 at 671 nm. On testing at 10 mW write power 60 dB CNR signal was obtained on reading.

EXAMPLE 18

For this example the same substrate, solvent, solution concentration (weight to volume), filter, spin coater, drying conditions, gold deposition process, and testing procedure was used as in the first example. The solution made using dye H-52 of Table 2 was coated on the grooved surface of the substrate to an optical density of 1.4 at 671 nm. On testing at 14 mW write power 51 dB CNR signal was obtained on reading.

EXAMPLE 19

For this example the same substrate, solvent, solution concentration (weight to volume), filter, spin coater, drying conditions, gold deposition process, and testing procedure was used as in the first example. The solution made using dye H-53 of Table 2 was coated on the grooved surface of the substrate to an optical density of 0.8 at 671 nm. On testing at 14 mW write power 50 dB CNR signal was obtained on reading.

EXAMPLE 20

For this example the same substrate, solvent, solution concentration (weight to volume), filter, spin coater, drying conditions, gold deposition process, and testing procedure was used as in the first example. The solution made using dye H-94 of Table 1 was coated on the grooved surface of the substrate to an optical density of 1.3 at 671 nm. On testing at 11 mW write power 59 dB CNR signal was obtained on reading.

EXAMPLE 21

For this example the same substrate, solvent, solution concentration (weight to volume), filter, spin coater, drying conditions, gold deposition process, and testing procedure was used as in the first example. The solution made using dye H-92 of Table 1 was coated on the grooved surface of the substrate to an optical density of 1.4 at 671 nm. On testing at 11 mW write power 59 dB CNR signal was obtained on reading.

EXAMPLE 22

For this example the same substrate, solvent, solution concentration (weight to volume), filter, spin coater, drying conditions, gold deposition process, and testing procedure was used as in the first example. The solution made using dye H-93 of Table 1 was coated on the grooved surface of the substrate to an optical density of 1.3 at 671 nm. On testing at 11 mW write power 59 dB CNR signal was obtained on reading.

EXAMPLE 23

For this example the same substrate, solvent, solution concentration (weight to volume), filter, spin coater, drying conditions, gold deposition process, and testing procedure was used as in the first example. The solution made using dye H-35 of Table 1 was coated on the grooved surface of the substrate to an optical density of 1.5 at 671 nm. On testing at 9 mW write power 60 dB CNR signal was obtained on reading.

EXAMPLE 24

For this example the same substrate, solvent, solution concentration (weight to volume), filter, spin coater, drying conditions, gold deposition process, and testing procedure was used as in the first example. The solution made using dye H-107 of Table 1 was coated on the grooved surface of the substrate to an optical density of 1.3 at 671 nm. On testing at 9 mW write power 60 dB CNR signal was obtained on reading.

EXAMPLE 25

For this example the same substrate, solvent, solution concentration (weight to volume), filter, spin coater, drying conditions, gold deposition process, and testing procedure was used as in the first example. The solution made using dye H-39 of Table 3 was coated on the grooved surface of the substrate to an optical density of 1.0 at 671 nm. On testing at 20 mW write power 31 dB CNR signal was obtained on reading.

EXAMPLE 26

Demonstration of Improved Physical Integrity of Polymeric Dye Layers

A 5 % by weight solution of a polymeric dye in 2,2,3,3-tetrafluoropropanol is spin-coated on a polycarbonate substrate, dried at 80° C. for ten minutes and sputtered with gold according to the following procedure. The substrates are coated in a vacuum system using the process of DC magnetron sputter deposition. The equipment is a research reproduction of a typical production facility. The stainless steel chamber consists of a VAT gate valve which is directly ported to a turbo molecular pump. A Lesker Torus 10 sputter cathode with a gold target is bolted to one side of the VAT valve body. A loadlock door assembly is mounted to the other side of the valve body, and the bare substrates are introduced to the chamber through this assembly. The target to substrate spacing is 6 cm and the Advanced Energy power supply provides approximately 8.0 kW, @ 620 V, for 0.02 minutes at an Argon flow of 80 sccm. This results in a gold film thickness of nearly 60 nm.

The integrity of the optical recording element thus assembled is tested by applying strips of commercially available tapes radially across the element and attempting to remove the gold from the dye layer. The peel force needed to remove each tape from sputtered gold in the absence of the dye was measured and this information was used to estimate the peel force necessary to remove the sputtered gold layer from the dye layer. An adhesive with 5 N/m peel force removes the gold from the dye monomer. The improvement in peel force with the polymeric dyes and dye mixtures is shown in Table 8, with "no" indicating that the gold layer did not peel of the write layer and "yes" indicating that it peeled off. This demonstrates the improved adhesion and cohesion of this invention vs the prior art.

TABLE 8

| Component 1, MW/1000 | Component 2 | Component 3 | Ratio | Post-It | Removable Tape | Scotch Tape | Splicing Tape |
|---|---|---|---|---|---|---|---|
| | | | | 5 N/m | 10 N/m | 210 N/m | 350 N/m |
| Reference S-3 addenda | | | | yes | yes | yes | yes |
| H-1, 98.4 | | | | no | no | no | yes |
| H-1, 8.1 | | | | no | no | no | yes |
| H-16 | | | | no | no | yes | |
| H-14 | | | | no | no | no | yes |
| H-27 | | | | no | no | no | yes |
| H-28 | | | | no | yes | | |
| H-26 | | | | no | no | yes | |
| H-88 | | | | no | no | yes | |
| H-35 | | | | no | no | no | |
| H-89 | | | | no | yes | | |
| H-90 | | | | yes | | | |
| H-94 | | | | no | yes | | |
| H-92 | | | | no | no | yes | |
| H-93 | | | | no | no | yes | |
| H-10 | | | | no | yes | | |
| H-29 | | | | no | no | no | yes |
| H-86 | | | | no | no | no | |
| H-29 | S-4 | | 4/1 | no | yes | | |
| H-29 | S-3 | | 3/2 | no | no | yes | |

The invention has been described in detail with particular reference to preferred embodiments thereof, but it will be understood that variations and modifications can be effected within the spirit and scope of the invention.

We claim:

1. A polymer (a) having, from 775 nm to 790 nm, a real refractive index (N) of >1.8 and an imaginary index (k) from 0.005 to 0.3; and (b) comprises from 75 to 100 mole percent repeating units according to Formula I:

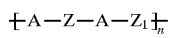
I wherein
  A represents a divalent radical selected from urethane, carbonate, urea, ester and amide;
  Z represents $C_2$–$C_{18}$-alkylene; $C_3$–$C_8$-cycloalkylene; $C_1$–$C_4$ alkylene bonded to $C_3$–$C_8$ cycloalkylene bonded to $C_1$–$C_4$ alkylene; $C_1$–$C_4$ alkylenearylene bonded to $C_1$–$C_4$ alkylene; $C_2$–$C_4$ alkoxy bonded to $C_2$–$C_4$ alkylene; arylene bonded to $C_1$–$C_4$ alkylene bonded to arylene; and $C_3$–$C_8$ cycloalkylene bonded to $C_1$–$C_4$-alkylene bonded to $C_3$–$C_8$ cycloalkylene;
  $Z_1$ represents a divalent dye radical selected from cyanines, formazans, metallized formazans, azos, metallized azos, metallized azo ethers, phthalocyanines, metallized phthalocyanines; and squariliums; and
  n represents the number of repeat units needed to build a copolymer chain or a size that corresponds to a polystyrene chain of weight average molecular weight ($M_w$) of 5,000 to 1,000,000.

2. A polymer according to claim 1 comprising 100 mole percent of the repeating unit and wherein n corresponds to $M_w$ of 5,000 to 100,000.

3. A polymer according to claim 1 wherein $Z_1$ is a divalent cyanine dye radical derived from cyanine dyes according to Formula II:

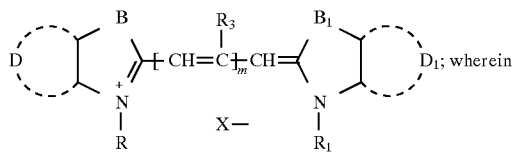
II; wherein

D and $D_1$ represent sufficient atoms to form a fused aromatic ring, and a heterocyclic ring;
B and $B_1$ represent

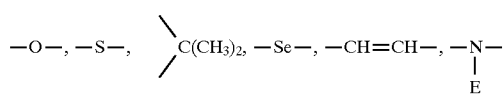

in which E represents a $C_1$ to $C_{10}$ alkyl and an aromatic ring; or B may combine with D, or $B_1$ may combine with $D_1$, to form fused aromatic rings;
  R and $R_1$ represent, $C_1$ to $C_{10}$ alkyl and $C_7$ to $C_{20}$ arylalkyl;
  $R_3$ represents hydrogen, $C_1$ to $C_{10}$ alkyl, $C_7$ to $C_{20}$ arylalkyl; and halogen such chlorine and bromine;
  X represents a anionic counter ion selected from

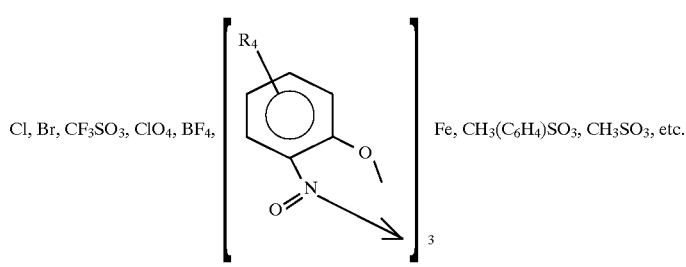

Cl, Br, CF₃SO₃, ClO₄, BF₄,     Fe, CH₃(C₆H₄)SO₃, CH₃SO₃, etc.

$R_4$ represents hydrogen, $C_1$ to $C_{10}$ alkyl, $C_1$ to $C_{10}$ alkoxy, and $R_4$ represents the atoms necessary to form a fused aromatic ring; and
  m represents an integer from 1 to 2.

4. A polymer according to claim 3 wherein the divalent cyanine dye radical is represented by Formula III:

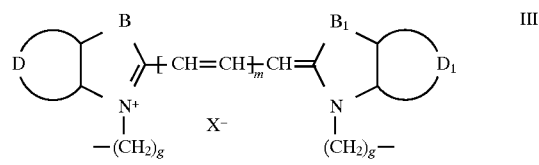
III g represents an integer from 2 to 10;
m represents an integer from 1 to 2; and
n corresponds to $M_w$ of 5,000 to 100,000.

5. A polymer according to claim 4 wherein divalent cyanine dye radical is represented by Formula IV:

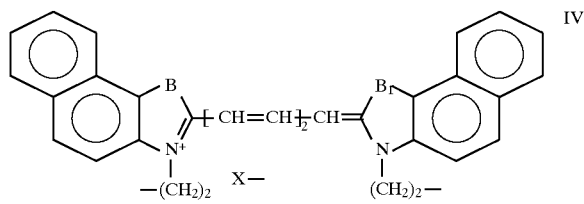
IV

6. A homopolymer according to claim 5.
7. A polymer according to claim 3 wherein:
  A represents oxycarbamoyl, oxycarbonyl, ureylene, carbonyldioxy and aminocarbonyl;
  Z represents tetramethylene, hexamethylene, dodecylmethylene, diphenylenemethane, dicyclohexylenemethane, 2-methylpentylene, cyclohexylene, m-phenylene, and m-tolylene;
  D and $D_1$ represent the atoms necessary to form naphthalene, methoxynaphthalene, benzene, and quinoxaline rings;
  B and $B_1$ represent isopropylidene, 1-butylpentylidene, ethenylene, nitrogen, oxygen and sulfur; and B and $B_1$ combines with D and $D_1$ to form a naphthalene ring;
  R and $R_1$ represent ethylene and propylene;
  $R_3$ represents hydrogen;
  X represents trifluoromethylsulfonate, para-toluenesulfonate, perchlorate, iodide, tetrafluoroborate, and

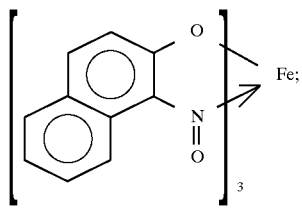

m represents 1 and 2; and n represents the number of repeat units needed to build a polymer chain of a size that corresponds to a polystyrene chain of weight-average molecular weight ($M_w$) of 5,000 to 100,000.

8. A polymer according to claim 4 selected from the polymers of Table 1.

9. A polymer according to claim 8 selected from polymers H-1, H-2, H-4, H-6, H-10, H-13, H-26, H-28, H-29, H-34, H-35, H-37, H-86, H-87, H-88, H-89, H-90, H-91, H-92, H-93, H-94, H-95, H-96, H-97, H-98, H-99 and H-111 of Table 1.

10. A polymer according to claim 1 wherein $Z_1$ is a divalent formazan dye radical derived from formazan dyes according to Formula V:

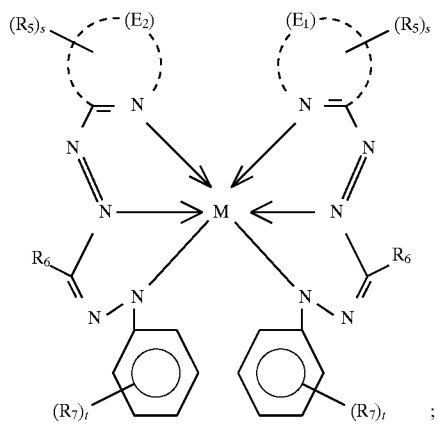

wherein $E_1$ and $E_2$ represent the atoms necessary to complete a 5- or 6-membered heterocyclic ring fused or heteroaromatic rings;

$R_5$ represents hydrogen, $C_1$–$C_{20}$ alkyl, $C_6$–$C_{10}$ aryl, $C_7$–$C_{30}$ arylalkyl, heteroaryl, $C_2$–$C_{20}$ alkenyl; alkoxy, $C_1$–$C_{10}$ alkoxycarbonyl, $C_6$–$C_{10}$ aryloxy, $C_6$–$C_{10}$ aryloxycarbonyl, carbamyl, sulfamoyl, $C_1$–$C_{10}$ acylamino, sulfonylamino, halogen, ureido, hydroxy, carbamoyloxy, $C_1$–$C_{10}$ alkoxycarbonylamino, nitro, cyano, thiocyano, and carboxy;

$R_6$ represents $C_1$–$C_{20}$ alkyl, heterocyclic, an aromatic ring, $C_1$–$C_{10}$ alkoxyphenyl, $C_1$–$C_{10}$ alkylphenyl, and $C_1$–$C_{10}$ alkoxycarbonylphenyl;

$R_7$ represents a substituent defined for $R_5$ above;

M represents a complexing metal ion; and s and t represent integers from 0 to 4.

11. A polymer according to claim 10 wherein $Z_1$ is a divalent formazan dye radical derived from formazan dyes according to Formula VI:

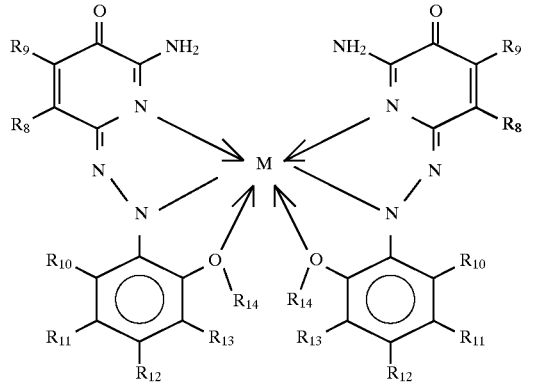

12. A homopolymer according to claim 11.

13. A polymer according to claim 10 wherein:

A represents oxycarbamoyl, oxycarbonyl, ureylene, carbonyldioxy and aminocarbonyl;

Z represents tetramethylene, hexamethylene, dodecylmethylene, diphenylenemethane, dicyclohexylenemethane, 2-methylpentylene, cyclohexylene, m-phenylene, and m-tolylene;

$E_1$ and $E_2$ represent the necessary atoms to form a pyridine ring;

$R_5$ represents hydrogen, nitro, diisopropylsulfamoyl, t-butylsulfamoyl, 1-methyl-2-methoxyethylsulfamoyl, trimethyleneoxy and methoxy;

$R_6$ represents trimethyleneoxyphenylene, 2-ethylhexyl, phenyl, ethylenephenylene and 2-methoxyphenyl; $R_7$ represents n-heptyl, sec-butyl, allyloxy, ethoxycarbonyl, and trimethyleneoxy; and s and t represent integers from 0 to 2.

14. A polymer according to claim 10 selected from the polymers of Table 2.

15. A polymer according to claim 10 selected from polymers H-48, H-52, H-53, H-63, and H-64, of Table 2.

16. A polymer according to claim 1 wherein $Z_1$ is a divalent azoether dye radical derived from azoethers according to Formula VII:

wherein $R_8$ represents hydrogen, halogen, $C_1$ to $C_{10}$ alkylsulfonyl, and sulfamoyl;

$R_9$ represents hydrogen and $C_1$ to $C_6$ alkyl;

and $R_8$ and $R_9$ may be taken together to form an aromatic ring;

$R_{10}$ and $R_{13}$ represents hydrogen, $C_1$ to $C_4$ alkyl and halogen;

$R_{11}$ represents hydrogen, $C_1$ to $C_6$ alkyl, nitro, $C_1$ to $C_6$ alkoxy, halogen, $SO_2R_{40}$ in which $R_{40}$ represents $C_1$ to $C_{10}$ alkyl; substituted and unsubstituted benzyl, $C_6$ to $C_{10}$ aryl; $C_5$ to $C_{10}$ hetaryl;

and $R_{10}$ and $R_{11}$ may be taken together to form an aromatic ring;

$R_{12}$ represents an electron withdrawing group;

$R_{13}$ represents hydrogen, $C_1$ to $C_4$ alkyl and halogen;

$R_{14}$ represents $C_1$ to $C_6$ alkyl, $C_3$ to $C_6$ alkenyl, benzyl group, $C_6$ to $C_{10}$ aryl; $C_4$ to $C_{10}$ hetaryl, $C_5$ to $C_{10}$ hetarylmethyl, and —$(CH_2)_jR_{18}$ in which j is an integer from 1 to 5 and $R_{18}$ represents cyano and $COOR_{15}$ in which $R_{15}$ represents $C_1$ to $C_{10}$ alkyl; and M represents a divalent metal ion.

17. A polymer according to claim 16 wherein $Z_1$ is an azo ether divalent radical according to Formula VIII:

wherein u represents an integer from 2 to 10.

18. A homopolymer according to claim 17.

19. A polymer according to claim 16 wherein:

A represents oxycarbamoyl, oxycarbonyl, ureylene, carbonyldioxy and aminocarbonyl;

Z represents tetramethylene, hexamethylene, dodecylmethylene, diphenylenemethane, dicyclohexylenemethane, 2-methylpentylene, cyclohexylene, m-phenylene, and m-tolylene;

$R_9$ represents hydrogen and methyl;

$R_{10}$ and $R_{13}$ represent hydrogen;

$R_{11}$ represents hydrogen and trimethyleneoxy;

$R_{12}$ represents nitro;

$R_{14}$ represents benzyl, t-butylbenzyl, allyl, ethoxycarbonylmethyl, and trimethyleneoxy;

M represents Ni.

20. A polymer according to claim 16 selected from the polymers of Table 3.

21. A polymer according to claim 20 represented by H-39 of Table 3.

22. A polymer according to claim 1 wherein $Z_1$ is a divalent azo dye radical derived from azo dyes according to Formula IX:

$R_{20}$ represents hydrogen and $C_1$ to $C_4$ alkyl;

$R_{21}$ represents an $C_1$ to $C_{10}$ alkyl, $SO_2R_{40}$, $SO_2NR_{41}R_{42}$ in which $R_{41}$ and $R_{42}$ represent hydrogen, $C_1$ to $C_{10}$ alkyl, benzyl, and $C_6$ to $C_{10}$ aryl;

$R_{20}$ and $R_{21}$ may be taken together to form an aromatic ring;

$R_{22}$ represents hydrogen, $C_1$ to $C_{10}$ alkyl, and halogen;

$R_{23}$ represents hydrogen, $C_1$ to $C_{10}$ alkyl, nitro, $C_1$ to $C_{10}$ alkoxy, halogen and $SO_2R_{40}$;

and $R_{22}$ and $R_{23}$ may be taken together to form a fused aromatic;

$R_{24}$ represents an electron withdrawing group selected from nitro, cyano, $SO_2R_{40}$, and $SO_2NR_{41}R_{42}$;

$R_{25}$ represents hydrogen, $C_1$ to $C_4$ alkyl and halogen;

M represents a divalent metal ion; and

Q represents Na, Li, $N(R_{30})_4$ in which $R_{30}$ represents $C_1$ to $C_6$ alkyl.

23. A polymer according to claim 22 wherein:

A represents oxycarbamoyl, oxycarbonyl, ureylene, carbonyldioxy and aminocarbonyl;

Z represents tetramethylene, hexamethylene, dodecylmethylene, diphenylenemethane, dicyclohexylenemethane, 2-methylpentylene, cyclohexylene, m-phenylene, and m-tolylene;

$R_{20}$ represents methyl;

$R_{21}$ represents methylsulfonyl and propylenesulfonyl;

$R_{22}$ represents hydrogen;

$R_{23}$ represents hydrogen, chlorine and bromine;

$R_{24}$ represents propylenesulfonyl, nitro, ethylsulfonyl, butylsulfonyl and isopropylsulfamoyl;

$R_{25}$ represents hydrogen;

M represents nickel; and

Q represents lithium, sodium, tetrabutylammonium and tetramethylammonium.

24. A homopolymer according to claim 23.

25. A polymer according to claim 23 selected from the polymers of Table 4.

26. A polymer according to claim 1 wherein $Z_1$ is a divalent azo dye radical derived from azo dyes according to Formula X:

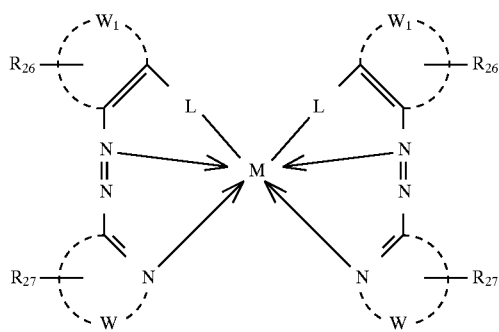

W represents sufficient atoms to form a mono and bicyclic heterocyclic ring;

$W_1$ represents sufficient atoms to form an aromatic ring;

L represents O, $SO_3^-$, and $CO_2^-$;

$R_{26}$ and $R_{27}$ represent hydrogen, $C_1$ to $C_{10}$ alkyl, $C_6$ to $C_{10}$ aryl, $C_1$ to $C_{10}$ alkoxy, $C_6$ to $C_{10}$ aryloxy, halogen, nitro and cyano;

M represents a divalent metal ion.

27. A polymer according to claim 26 selected from polymers of Table 5.

28. A polymer according to claim 1 wherein $Z_1$ is a divalent phthalocyanine dye radical derived from phthalocyanine dyes according to Formula XI:

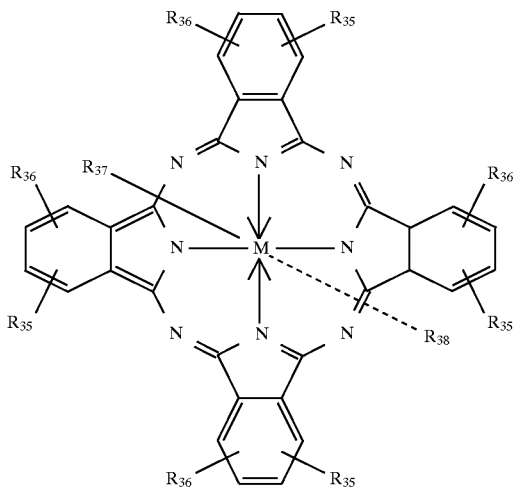

$R_{35}$ and $R_{36}$ represent hydrogen, halogen, $C_1$ to $C_6$ alkyl, $C_7$ to $C_{12}$ arylalkyl, $C_1$ to $C_6$ alkoxy, $C_6$ to $C_{10}$ aryloxy and $C_1$ to $C_6$ alkylthio and $C_6$ to $C_{10}$ arylthio;

$R_{37}$ and $R_{38}$ represent $C_1$ to $C_6$ alkoxy; and

M represents Cu, Pd, Pt, Fe, Co, Si, Ge, and Sn.

29. A polymer according to claim 28 wherein $Z_1$ is a divalent phthalocyanine dye radical is represented by Formula XII:

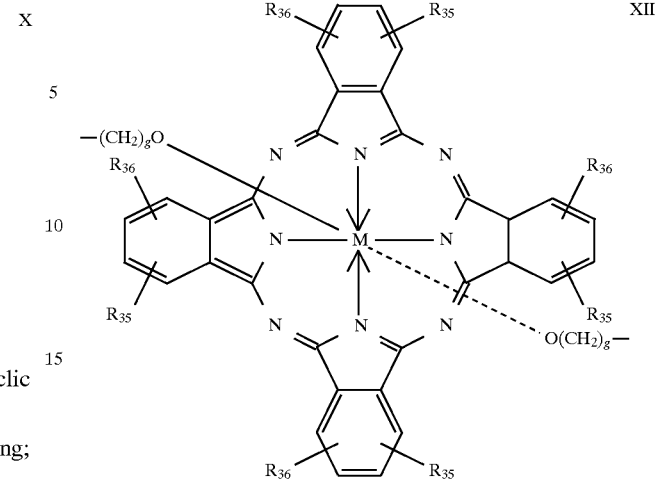

wherein g represents an integer from 2 to 10; and

M represents Si and Ge.

30. A polymer according to of claim 29 wherein:

A represents oxycarbamoyl, oxycarbonyl, ureylene, carbonyldioxy and aminocarbonyl;

Z represents tetramethylene, hexamethylene, dodecylmethylene, diphenylenemethane, dicyclohexylenemethane, 2-methylpentylene, cyclohexylene, m-phenylene, and m-tolylene;

$R_{35}$ and $R_{36}$ represent hydrogen, bromine, nitro, 2,4-dimethylpentyl-3-oxy, 3-methylbutyl-2-oxy, and 2-ethylhexyl-1-oxy;

M represents Si, Ge and Co; and g represents an integer from 2 to 3.

31. A homopolymer according to claim 30.

32. A polymer according to claim 30 selected from the polymers of Table 6.

33. A polymer according claim 1 wherein $Z_1$ comprises divalent radical derived from a squarilium dye according to Formula XIII:

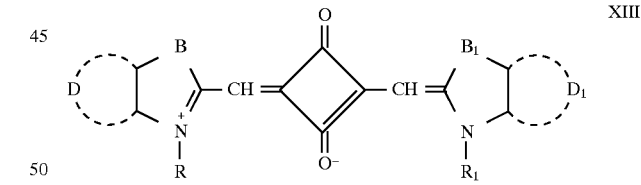

B and $B_1$ represent

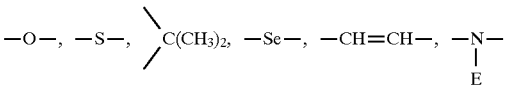

in which E represents $C_1$ to $C_{10}$ alkyl and an aromatic ring;

D and $D_1$ represent sufficient atoms to form a fused aromatic ring or a heterocyclic ring;

or B may combine with D, and $B_1$ may combine with $D_1$, to form fused aromatic rings;

R and $R_1$ represent, $C_1$ to $C_{10}$ alkyl and $C_7$ to $C_{20}$ arylalkyl.

34. A polymer according to claim 33 wherein:

A represents oxycarbamoyl, oxycarbonyl, ureylene, carbonyldioxy and aminocarbonyl;

Z represents tetramethylene, hexamethylene, dodecylmethylene, diphenylenemethane, dicyclohexylenemethane, 2-methylpentylene, cyclohexylene, m-phenylene, and m-tolylene;

D and $D_1$ represent naphthyl, phenyl and tolyl;

B and $B_1$ represent —S— and

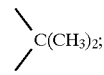

and

R and $R_1$ represent ethylene.

35. A homopolymer according to claim 34.

36. The polymer composition of claim 35 selected from the polymers of Table 6.

* * * * *